United States Patent
Pellegrino et al.

(10) Patent No.: US 12,521,335 B2
(45) Date of Patent: Jan. 13, 2026

(54) COSMETIC COMPOSITIONS CONTAINING VITAMIN C COMPOUNDS AND USES THEREOF

(71) Applicant: RoC OPCO LLC, New York, NY (US)

(72) Inventors: Arthur Pellegrino, Newtown, PA (US); Fred Khoury, Chatsworth, CA (US); Ellen Delisle, Hauppauge, NY (US)

(73) Assignee: RoC OPCO LLC, New York, NY (US)

( * ) Notice: Subject to any disclaimer, the term of this patent is extended or adjusted under 35 U.S.C. 154(b) by 0 days.

(21) Appl. No.: 17/749,630

(22) Filed: May 20, 2022

(65) Prior Publication Data

US 2022/0370327 A1 Nov. 24, 2022

Related U.S. Application Data

(60) Provisional application No. 63/191,213, filed on May 20, 2021.

(51) Int. Cl.
*A61K 8/67* (2006.01)
*A61K 8/64* (2006.01)
(Continued)

(52) U.S. Cl.
CPC ............... *A61K 8/676* (2013.01); *A61K 8/64* (2013.01); *A61K 8/86* (2013.01); *A61K 8/9789* (2017.08);
(Continued)

(58) Field of Classification Search
CPC . A61K 8/676; A61K 8/64; A61K 8/86; A61K 8/9789; A61K 2800/522;
(Continued)

(56) References Cited

U.S. PATENT DOCUMENTS 5,661,119 A 8/1997 Hersh et al.
6,403,541 B1 6/2002 Park
(Continued)

FOREIGN PATENT DOCUMENTS

CN 105640869 A * 6/2016 ............... A61K 8/34
CN 108056929 A * 5/2018 ............. A61K 38/05
(Continued)

OTHER PUBLICATIONS

Nikko Chemicals. "Nikkol SG-G2424"; https://in.nikkolgroup.com/products/nikkol-sg-g2424/; accessed Mar. 6, 2023. (Year: NA).*
(Continued)

*Primary Examiner* — Frederick F Krass
*Assistant Examiner* — Lucy M Tien
(74) *Attorney, Agent, or Firm* — Greenberg Traurig, LLP; Jonathan D. Ball

(57) ABSTRACT

Disclosed herein are cosmetic compositions comprising a Vitamin C compound, a peptide, an antioxidant, and a hydrating agent. Also disclosed is a method visibly improving skin by brightening skin, evening skin tone, tightening skin, plumping skin, or improving the appearance of fine lines and wrinkles by topically applying a cosmetic composition comprising Vitamin C compound, a peptide, an antioxidant, and a hydrating agent.

19 Claims, 1 Drawing Sheet

(51) Int. Cl.
*A61K 8/86* (2006.01)
*A61K 8/9789* (2017.01)
*A61Q 19/08* (2006.01)

(52) U.S. Cl.
CPC ........ *A61Q 19/08* (2013.01); *A61K 2800/522* (2013.01); *A61K 2800/805* (2013.01)

(58) Field of Classification Search
CPC .. A61K 2800/805; A61K 8/602; A61K 8/042; A61K 8/062; A61K 2800/72; A61Q 19/08; A61Q 19/02
USPC ....................................................... 424/401
See application file for complete search history.

(56) References Cited

U.S. PATENT DOCUMENTS

| | | |
|---|---|---|
| 6,444,144 B1 | 9/2002 | Chung et al. |
| 6,447,817 B1 | 9/2002 | Niyiro et al. |
| 6,541,045 B1 | 4/2003 | Charters et al. |
| 6,641,848 B1 | 11/2003 | Bonte et al. |
| 6,713,078 B2 | 3/2004 | Lehrer et al. |
| 6,855,697 B1 | 2/2005 | Estanove et al. |
| 7,083,779 B2 | 8/2006 | Behl et al. |
| 7,179,841 B2 | 2/2007 | Zielinski et al. |
| 7,223,775 B2 | 5/2007 | Nishimura et al. |
| 7,314,858 B2 | 1/2008 | Lehrer et al. |
| 7,632,527 B2 | 12/2009 | Jochim et al. |
| 7,709,432 B2 | 5/2010 | Saito et al. |
| 7,718,610 B2 | 5/2010 | Lehrer et al. |
| 7,741,496 B2 | 6/2010 | Tsai et al. |
| 7,763,288 B2 | 7/2010 | Sovak et al. |
| 7,838,690 B2 | 11/2010 | Park et al. |
| 7,964,221 B2 | 6/2011 | Ohishi et al. |
| 8,163,939 B2 | 4/2012 | Yoshioka et al. |
| 8,425,949 B2 | 4/2013 | Ohishi et al. |
| 8,435,541 B2 | 5/2013 | Ceccoli et al. |
| 8,486,997 B2 | 7/2013 | Shinto et al. |
| 8,501,246 B2 | 8/2013 | Li et al. |
| 8,580,320 B2 | 11/2013 | Blum et al. |
| 8,613,910 B2 | 12/2013 | Rudolph et al. |
| 8,722,109 B1 | 5/2014 | Fahad |
| 8,921,312 B2 | 12/2014 | Musselmann et al. |
| 8,980,344 B2 | 3/2015 | Gross |
| 9,023,889 B2 | 5/2015 | Rudolph et al. |
| 9,044,426 B2 | 6/2015 | Hilpert et al. |
| 9,248,160 B1 | 2/2016 | Obagi et al. |
| 9,320,704 B1 | 4/2016 | Nayak |
| 9,370,478 B2 | 6/2016 | Bonner et al. |
| 9,498,424 B2 | 11/2016 | Maurin et al. |
| 9,610,242 B2 | 4/2017 | Weisman et al. |
| 9,913,785 B2 | 3/2018 | Sweeny et al. |
| 9,949,913 B2 | 4/2018 | Marini et al. |
| 10,124,030 B2 | 11/2018 | Goldsberry et al. |
| 10,137,070 B2 | 11/2018 | Park |
| 10,149,816 B2 | 12/2018 | Levy |
| 10,278,915 B1 | 5/2019 | Kawa |
| 10,322,078 B2 | 6/2019 | Yamada |
| 10,507,177 B1 | 12/2019 | Kawa |
| 10,512,603 B2 | 12/2019 | Almiñana Domènech et al. |
| 10,646,425 B1 | 5/2020 | Said et al. |
| 10,668,124 B2 | 6/2020 | Park |
| 10,675,323 B2 | 6/2020 | Gan et al. |
| 10,857,084 B2 | 12/2020 | Constantine et al. |
| 10,864,154 B2 | 12/2020 | Majeed et al. |
| 2003/0152544 A1 | 8/2003 | Chen |
| 2004/0022823 A1 | 2/2004 | Uchida et al. |
| 2004/0063593 A1 | 4/2004 | Wu et al. |
| 2004/0115163 A1 | 6/2004 | Gedouin et al. |
| 2005/0002894 A1 | 1/2005 | Petersohn et al. |
| 2005/0003029 A1 | 1/2005 | Gauri |
| 2005/0220749 A1 | 10/2005 | Gedouin et al. |
| 2005/0249720 A1 | 11/2005 | Perez |
| 2006/0018867 A1 | 1/2006 | Kawasaki et al. |
| 2007/0048246 A1 | 3/2007 | Sovak et al. |
| 2007/0098670 A1 | 5/2007 | Jochim et al. |
| 2007/0166275 A1 | 7/2007 | Gan et al. |
| 2007/0224229 A1 | 9/2007 | Gibbons et al. |
| 2008/0193600 A1 | 8/2008 | Werstak et al. |
| 2008/0199533 A1 | 8/2008 | DeLaRosa |
| 2009/0068255 A1 | 3/2009 | Yu et al. |
| 2010/0035831 A1 | 2/2010 | Matsunaga et al. |
| 2010/0055059 A1 | 3/2010 | Criton et al. |
| 2010/0062088 A1 | 3/2010 | Gan et al. |
| 2010/0204464 A1 | 8/2010 | Li et al. |
| 2010/0215783 A1 | 8/2010 | McNeary |
| 2010/0233128 A1 | 9/2010 | Panasenko |
| 2010/0303745 A1 | 12/2010 | Fish et al. |
| 2011/0142775 A1 | 6/2011 | Kostick et al. |
| 2011/0189152 A1 | 8/2011 | Virmani et al. |
| 2011/0229538 A1 | 9/2011 | Matravers et al. |
| 2012/0121725 A1* | 5/2012 | Garnier ................. A61K 8/645 424/642 |
| 2012/0189564 A1 | 7/2012 | Zolotarsky et al. |
| 2012/0276030 A1 | 11/2012 | Marthaler et al. |
| 2013/0149361 A1 | 6/2013 | Gan |
| 2014/0106001 A1 | 4/2014 | Lewis |
| 2014/0113337 A1 | 4/2014 | Lin et al. |
| 2014/0155633 A1 | 6/2014 | Chen et al. |
| 2014/0170080 A1 | 6/2014 | Rowville |
| 2014/0371333 A1 | 12/2014 | Hashizaki et al. |
| 2015/0037389 A1 | 2/2015 | Ragot et al. |
| 2015/0250169 A1 | 9/2015 | Ihori et al. |
| 2015/0306010 A1 | 10/2015 | Carvalho et al. |
| 2016/0074309 A1 | 3/2016 | Kessler-Becker et al. |
| 2016/0158134 A1 | 6/2016 | Disalvo |
| 2017/0027852 A1 | 2/2017 | Sweeney et al. |
| 2017/0042784 A1 | 2/2017 | Munk et al. |
| 2017/0231890 A1* | 8/2017 | Pernodet .................. C07K 5/08 424/195.17 |
| 2017/0312301 A1 | 11/2017 | Saeki et al. |
| 2018/0071205 A1 | 3/2018 | Disalvo |
| 2018/0092826 A1 | 4/2018 | Comeron et al. |
| 2018/0110721 A1 | 4/2018 | Bell et al. |
| 2018/0228714 A1 | 8/2018 | Thomas |
| 2018/0318202 A1 | 11/2018 | Tomlinson et al. |
| 2018/0369129 A1 | 12/2018 | Weiss et al. |
| 2019/0060389 A1 | 2/2019 | Gan et al. |
| 2019/0298786 A1 | 10/2019 | Hajjar et al. |
| 2019/0314648 A1 | 10/2019 | Sitaram et al. |
| 2019/0328645 A1 | 10/2019 | Hicks et al. |
| 2019/0350820 A1 | 11/2019 | Fan et al. |
| 2020/0002377 A1 | 1/2020 | Van Den Nest et al. |
| 2020/0016062 A1 | 1/2020 | Cock et al. |
| 2020/0016063 A1 | 1/2020 | Baek et al. |
| 2020/0188292 A1 | 6/2020 | Carle et al. |
| 2020/0221740 A1 | 7/2020 | Cock et al. |
| 2020/0390097 A1 | 12/2020 | Ben Kaab et al. |
| 2021/0093539 A1* | 4/2021 | LaRosa ................. A61K 8/416 |
| 2022/0241181 A1* | 8/2022 | Bardey ................. A61K 8/4966 |
| 2023/0390184 A1* | 12/2023 | Skaar ..................... A61K 8/368 |

FOREIGN PATENT DOCUMENTS

| | | | |
|---|---|---|---|
| JP | 2018104309 A * | 7/2018 | |
| WO | 1999050258 A1 | 10/1999 | |
| WO | 2000035933 A1 | 6/2000 | |
| WO | 2002056856 A1 | 7/2002 | |
| WO | 2002085401 A1 | 10/2002 | |
| WO | 2007012356 A1 | 2/2007 | |
| WO | 2007084998 A2 | 7/2007 | |
| WO | WO-2007128840 A2 * | 11/2007 | ............. A61K 31/00 |
| WO | 2008107533 A2 | 9/2008 | |
| WO | 2009025328 A1 | 2/2009 | |
| WO | 2010049457 A2 | 5/2010 | |
| WO | 2010111745 A1 | 10/2010 | |
| WO | 2012023584 A1 | 2/2012 | |
| WO | 2012083906 A2 | 6/2012 | |
| WO | 2013053772 A1 | 4/2013 | |
| WO | 2015045446 A1 | 4/2015 | |
| WO | 2015114855 A1 | 8/2015 | |
| WO | 2016157547 A1 | 10/2016 | |
| WO | 2017157366 A1 | 9/2017 | |
| WO | 2018001571 A1 | 1/2018 | |

(56) References Cited

FOREIGN PATENT DOCUMENTS

| | | | |
|---|---|---|---|
| WO | 2018032836 | A1 | 2/2018 |
| WO | 2018112515 | A1 | 6/2018 |
| WO | 2018145159 | A1 | 8/2018 |
| WO | 2018221337 | A2 | 12/2018 |
| WO | 2019103216 | A1 | 5/2019 |
| WO | 2019130301 | A1 | 7/2019 |
| WO | 2019131892 | A1 | 7/2019 |
| WO | 2019211567 | A1 | 11/2019 |
| WO | 2019229771 | A2 | 12/2019 |
| WO | 2019236947 | A1 | 12/2019 |
| WO | 2020010919 | A1 | 1/2020 |
| WO | 2020067132 | A1 | 4/2020 |
| WO | 2020087146 | A1 | 5/2020 |
| WO | 2020128223 | A1 | 6/2020 |
| WO | 2020135896 | A1 | 7/2020 |
| WO | 2020163942 | A1 | 8/2020 |
| WO | 2020165514 | A1 | 8/2020 |
| WO | 2020201065 | A1 | 10/2020 |
| WO | 2020201067 | A1 | 10/2020 |
| WO | 2020201068 | A1 | 10/2020 |
| WO | 2020201069 | A1 | 10/2020 |
| WO | 2020262041 | A1 | 12/2020 |
| WO | 2019189742 | A1 | 4/2021 |

OTHER PUBLICATIONS

Tenny, S., & Abdelgawad, I. (Nov. 23, 2023). Statistical significance. StatPearls—NCBI Bookshelf. https://www.ncbi.nlm.nih.gov/books/NBK459346/ (Year: 2023).* https://www.riteaid.com/shop/roc-multi-correxion-revive-glow-gel-cream-1-7-oz;RoC Skincare;ROC Multi Correxion Revive + Glow Gel Cream—1.7 oz, Jan. 25, 2021.

Wathoni et al. "Effect of iontophoresis and propylene glycol on the in vitro diffusion of ethyl vitamin c cream" Int. Res J Pharm. App Sci., vol. 2, No. 4, 31-34 (2012).

International Search Report and Written Opinion dated Aug. 18, 2022, in PCT/US 22/30316 (8 pages).

Peerzada, et al. "Vitamin C and elemental composition of some bushfruits," Journal of Plant Nutrition, 13:7, 787-793 (1990) (abstract only submitted) (3 pages).

Cozzolino et al. "The use of vibrational spectroscopy to predict Vitamin C in Kakadu plum powders," Nov. 20, 2020, Queensland, Australia (18 pages).

Database GNPD Mintel; "Daily Serum", Mar. 10, 2021, 2 pp.

* cited by examiner

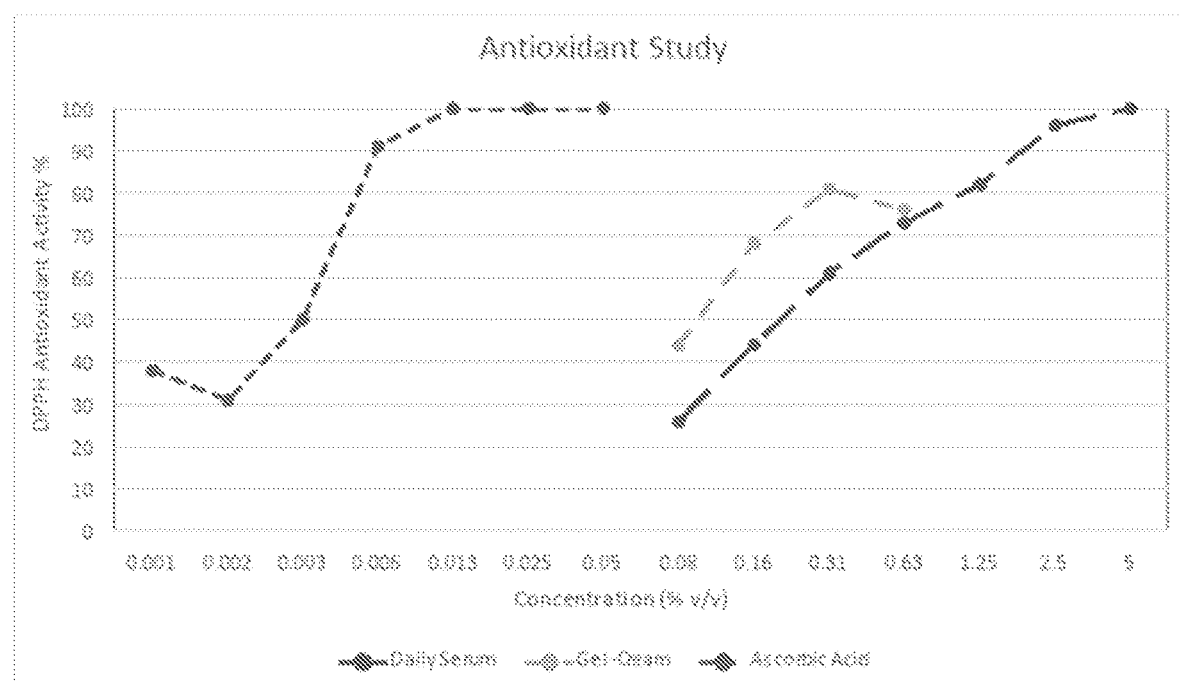

COSMETIC COMPOSITIONS CONTAINING VITAMIN C COMPOUNDS AND USES THEREOF

CROSS REFERENCE TO RELATED APPLICATION

This patent application claims the benefit of U.S. Provisional Application 63/191,213 filed May 20, 2021, the contents of which are incorporated by reference herein.

BACKGROUND

Vitamin C and its derivatives, in particular 3-O-ethyl-L-ascorbic acid (also known as ethyl vitamin C), are widely used in cosmetics to promote collagen biosynthesis, provide photoprotection, reduce melanin, and scavenge free radicals. Despite its widespread use, there are numerous documented cases of allergic contact dermatitis caused by ethyl vitamin C. What is needed is an improved cosmetic formulation that harnesses and enhances ethyl vitamin C's skin benefits while simultaneously eliminating unwanted irritation.

SUMMARY

According to embodiments, cosmetic compositions are provided containing a Vitamin C compound, a peptide, an antioxidant, and a hydrating agent. Embodiments of the invention also include a method of improving the skin by topically applying a cosmetic composition containing a Vitamin C compound, a peptide, an antioxidant, and a hydrating agent.

One general aspect of the invention includes a cosmetic composition containing a vitamin C compound, a peptide, an antioxidant, and a hydrating agent.

In one aspect, the Vitamin C compound contains one or more of 3-O-ethyl ascorbic acid and *Terminalia ferdinandiana* fruit extract. In another aspect, the vitamin C compound contains both 3-O-ethyl ascorbic acid and *Terminalia ferdinandiana* fruit extract.

In one aspect, the peptide is nonapeptide-1.

In one aspect, the antioxidant contains one or more of troxerutin, *Polygonum aviculare* extract, and *Cistus monspeliensis* flower, leaf, and stem extract. In another aspect, the antioxidant contains troxerutin, *Polygonum aviculare* extract, and *Cistus monspeliensis* flower, leaf, and stem extract.

In one aspect, the hydrating agent contains one or more of PPG-24-glycereth-24, a plant-based glyceride, a fruit complex, or a combination thereof.

In one aspect, the hydrating agent contains PPG-24-glycereth-24.

In one aspect, the hydrating agent contains one or more of a plant-based glyceride, a fruit complex, or a combination thereof.

In one aspect, the cosmetic composition is an oil-in-water emulsion or a gel-cream.

In one aspect, the cosmetic composition contains one or more dermatological excipients. In one aspect, the dermatological excipients include one or more of propanediol, 1,2-hexanediol, caprylhydroxamic acid, glycerin, caprylyl glycol, yellow 6, PPG-26-buteth-26, PEG-40 hydrogenated castor oil, sodium phosphate, disodium phosphate, sodium polyacryloyldimethyl taurate, fragrance, maltodextrin, disodium EDTA, citric acid, dicaprylyl carbonate, trimethylolpropane tricaprylate/tricaprate, tridecyl trimellitate, 1,2-butylene glycol, yellow 5, dimethicone, polysilicone-11, cetearyl alcohol, cetearyl glucoside, sodium phosphate, polyglceryl-3 methylglucose distearate, ammonium acryloyldimethyltaurate/beheneth-25 methacrylate crosspolymer, polyacrylate crosspolymer-6, maltodextrin, sodium lactate, sodium PCA, potassium sorbate, sodium benzoate, sodium citrate, and combinations thereof.

In one aspect, the Vitamin C compound is present at up to about 1% by weight of the composition, the peptide is present at up to about 0.005% by weight of the composition, the antioxidant is present at up to about 1% by weight of the composition, and the hydrating agent is present at up to about 3% by weight of the composition. In another aspect, the Vitamin C compound is present at up to about 1% by weight of the composition, the peptide is present at up to about 0.005% by weight, the antioxidant is present at up to about 0.25% by weight, and the hydrating agent is present at up to about 1.00% by weight.

In another aspect, the cosmetic composition does not cause skin irritation.

In another aspect, disclosed is a method of improving the skin by topically applying the cosmetic composition. In one aspect, improving the skin includes visibly brightening skin, visibly evening skin tone, visibly tightening skin, or visibly plumping skin. In another aspect, improving the skin includes improving the appearance of fine lines and wrinkles. In one aspect the composition is applied to a cleansed face and neck. In another aspect the composition is applied in the morning, the evening, or both.

BRIEF DESCRIPTION OF THE DRAWINGS

FIG. 1 depicts a graphical representation of the antioxidant assay results for the daily serum of Example 1B and the gel-cream of Example 1C, and the ascorbic acid control.

DETAILED DESCRIPTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Unless otherwise indicated, all parts and percentages are by weight. As used herein, the term "about" refers to plus or minus 10% of the indicated value. Unless otherwise stated or made clear by context, weight percentages are provided based on the total amount of the composition in which they are described. As used herein, the singular forms "a," "an," and "the" include plural referents unless the context clearly dictates otherwise.

Described herein are cosmetic compositions containing a Vitamin C compound, a peptide, an antioxidant, and a hydrating agent, and methods of brightening skin, evening skin tone, tightening skin, firming skin, plumping skin, and reducing fine lines and wrinkles by administering an effective amount of a cosmetic composition containing a Vitamin C compound, a peptide, an antioxidant, and a hydrating agent.

In one aspect, described herein is a cosmetic composition containing: a Vitamin C compound, a peptide, an antioxidant, and a hydrating agent.

The body, including its skin, is primarily damaged/aged via exposure to environmental aggressors. These aggressors include UVA and UVB radiation, pollution, smoke, and other factors that cause oxidative stress. Antioxidants are a well-known source for quenching this oxidative stress before it causes permanent damage to cell DNA. However, because each of these aggressors respond differently to different antioxidants, a blend of antioxidants is more effective in providing an overall benefit. The present invention includes a combination of ingredients to obtain a synergistic effect and avoid high levels of any one ingredient, like ascorbic acid and its derivatives, which are irritating to skin. An effective combination of antioxidants was provided to establish this synergy and achieve an effect not able to be provided by any one antioxidant alone.

Vitamin C Compounds

According to the invention, Vitamin C compounds include Vitamin C, analogs, derivatives and precursors that form Vitamin C or function similarly to Vitamin C in a cosmetic formulation. Exemplary effects of Vitamin C in cosmetics include promoting collagen biosynthesis, providing photoprotection, reducing melanin formation, and scavenging free radicals, and can result in observable benefits such skin brightening and evening of tone. According to the present invention, the Vitamin C compound can be provided as a discrete chemical, for example as Vitamin C (ascorbic acid) or ethyl vitamin C (3-O-ethyl ascorbic acid), or as an extract known to be rich in Vitamin C compounds, for example, *Terminalia ferdinandiana* (i.e. Kakadu plum) fruit extract.

Suitable Vitamin C compounds include, but are not limited to: 3-O-ethyl ascorbic acid; Ascorbic acid; Ascorbyl isostearate; Ascorbyl glucoside; Ascorbyl palmitate; Magnesium ascorbyl phosphate; Sodium ascorbyl phosphate; Trisodium ascorbyl palmitate phosphate; Ascorbyl methylsilanol pectinate; Aminopropyl ascorbyl Phosphate; Potassium ascorbyl tocopheryl phosphate; Ascorbyl tetraisopalmitate; Tetrahexyldecyl ascorbate; and 3-glyceryl ascorbate.

Suitable extracts used as Vitamin C compounds include, but are not limited to: *Terminalia ferdinandiana* (i.e. Kakadu plum); *Myrciaria dubia* (i.e. camu-camu); *Malpighia emarginata* (i.e. acerola cherry); *Averrhoa carambola* (i.e. carambola*/starfruit); and rose hip.

Other suitable compounds useful as Vitamin C compounds include free radical scavenging agents, oxygen scavenging agents, and chelating agents.

The Vitamin C compound can be present in an amount of from about 0.01% up to about 30% by weight, for example, from about 0.1% to about 5% by weight, about 3% by weight, or about 1% by weight.

In any embodiment, the Vitamin C compound can be provided as one or more of 3-O-ethyl ascorbic acid or *Terminalia ferdinandiana* fruit extract. In other embodiments, the Vitamin C compound is provided as a combination of 3-O-ethyl ascorbic acid and *Terminalia ferdinandiana* fruit extract.

Peptides

Suitable peptides for use in the invention include those with anti-aging effects. Such peptides can include, but are not limited to, the following: Palmitoyl Tripeptide-1; Palmitoyl Tetrapeptide-7; N-Prolyl Palmitoyl Tripeptide-56 Acetate; Palmitoyl Tripeptide-38; Palmitoyl Hexapeptide-12; Copper Tripeptide-1; Acetyl Hexapeptide-38; Acetyl Hexapeptide-30; Acetyl Tetrapeptide-22; Pentapeptide-34 Trifluoroacetate; Diaminopropionoyl Tripeptide-33; Acetyl Hexapeptide-8; Acetyl Hexapeptide-8; Pentapeptide-18; Acetyl Heptapeptide-4; Octapeptide-5; Hexapeptide-3; Myristoyl Hexapeptide-16; Myristoyl Nonapeptide-3; Heptapeptide-7; Palmitoyl Tetrapeptide-20 Amide; Palmitoyl Oligopeptide-78; Palmitoyl Heptapeptide-27; Dipalmitoyl Hydroxyproline; and Nonapeptide-1.

The peptide can be present in an amount of from about 0.001% to about 1% by weight, for example, from about 0.001% to about 0.01% by weight, or about 0.005% by weight.

Nonapeptide-1 is a synthetic nonapeptide derived from melanocyte stimulating hormone (MSH) containing the amino acids arginine, lysine, methionine, phenylalanine, proline, tryptophan, and valine. It is a skin lightening (i.e. whitening) peptide used in cosmetics to prevent the activity of tyrosinase in melanocytes, inhibit melanin synthesis, and help even out skin tone by lessening hyper-pigmentation, thereby reducing the formation of unwanted pigmentation. This allows for control over skin tone and brown spots.

In an exemplary embodiment, the peptide is provided as nonapeptide-1.

Antioxidants

Although Vitamin C has antioxidant properties and many fruit extracts contain some Vitamin C, as used herein antioxidants refers to components added for purposes other than specifically increasing Vitamin C content. Suitable antioxidants include: chain-breaking antioxidants, primary and secondary enzymatic antioxidants, and non-enzymatic antioxidants.

Chain-breaking antioxidants include, but are not limited to, Vitamin E, carotenoids, and flavonoids.

Primary and secondary enzymatic antioxidants include, but are not limited to, the following: Superoxide dismutase (i.e. SOD); Glutathione peroxide; and Glutathione reductase.

Non-enzymatic antioxidants include, but are not limited to, the following: Cofactors, such as coenzyme Q10). Minerals, such as zinc or selenium. Organosulfur compounds, such as allyl sulfide indoles or glutathione. Vitamins & derivatives thereof, such as vitamin A, retinol, vitamin C, ascorbates, vitamin E, tocopherols, tocotrienols, or vitamin K. Carotenoids, such as β-carotene, lycopene, lutein, or zeaxanthin. Nitrogen non-protein compounds, such as uric acid. Phenolic acids, such as hydroxycinnamic acids, including ferulic acid or ρ-coumaric, and hydroxybenzoic acids, including gallic acid and ellagic acid. Flavonoids, including flavonols, such as quercetin or kaempferol, flavanols such as catechin or pelagonidin, anthocyanins such as cyanidin or pelargonidin, isoflavonoids such as genistein, flavanones such as hesperidin, and flavones such as chrysin. Chelators, such as sodium phytate, ethylenediaminetetraacetic acid (i.e. EDTA) and derivatives and salts thereof, or phosphates. Other non-enzymatic antioxidants include, bis-ethylhexyl hydroxydimethoxy benzylmalonate (i.e. HDBM), butylated hydroxytoluene (i.e. BHT), beta hydroxy acid (i.e. BHA), or alpha lipoic acid.

The antioxidant can be present in an amount of from about 0.01% to about 10% by weight, for example, from about 0.1% to about 5% by weight, or about 1% by weight.

Troxerutin is a flavonoid that is typically extracted from the Japanese plant *Sophora japonica* that functions as an antioxidant, while also having powerful soothing properties.

It is known to inhibit lipoxygenase and reduce the formation of prostaglandins, both of which are well known inflammation mediators. Its skin-soothing cosmetic properties arise from troxerutin's ability to support healthy microcirculation of blood and lymph by regulating capillary resistance.

*Polygonum aviculare* extract, derived from knotgrass, is rich in flavonoids and known for its UV protective effects. It has been shown to be an antioxidant protecting against infrared-induced and thermal aging of skin, and provides complimentary protection as that of typical sunscreen products. The flavonoids present in the extract inhibit Cathepsin G, an enzyme involved in photoaging, and protect fibers of papillary and reticular dermis from global sun damage, thereby maintaining skin firmness and elasticity. It has also been shown to reduce visible signs of photoaging and the appearance of wrinkles.

*Cistus monspeliensis* extract is derived from Rockrose and protects the skin collagen from outdoor and indoor aging from UVA, UVB, Blue Light, and pollution. It has also been shown to be an antioxidant useful to accelerate skin recovery and epidermal renewal, reduce wrinkles and fine lines, and improve skin texture.

In an exemplary embodiment, the antioxidant includes one or more of troxerutin, *Polygonum aviculare* extract, and *Cistus monspeliensis* flower, leaf, and stem extract. In embodiments, the antioxidant includes two or more of troxerutin, *Polygonum aviculare* extract, and *Cistus monspeliensis* flower, leaf, and stem extract. In an exemplary embodiment, the antioxidant includes troxerutin, *Polygonum aviculare* extract, and *Cistus monspeliensis* flower, leaf, and stem extract.

Hydrating Agents

Suitable hydrating agents include, but are not limited to, the following:

Hydrating agents include moisturizing agents such as natural moisturizing factors (i.e. NMF) and others. Examples of hydrating agents include, for example, Amino acids; PCA derivatives; Lactates; Urea; Sugars; Uric Acid; Creatine; Glucosamine; Glycosaminoglycans (i.e. hyaluronic acid, polyglutamic acid); and Polysaccharides (i.e. aloe). Hydrating agents may be present in their non-ionic form or as a salt, such as, for example, a Cl, Na, K, Ca, or Mg salt.

The hydrating agent can be present in an amount of from about 0.1% to about 20% by weight, for example, from about 1% to about 5% by weight, or about 3% by weight. According to the invention, hydrating agents include PPG-24-glycereth-24, plant-based glycerides, and fruit complexes.

PPG-24-glycereth-24, also known as Barsoft TXM, is a hydrophobically modified form of glycerin designed to increase the deposition of water-soluble ingredients into the skin. One portion of the molecule penetrates into the skin, while the glycerin moiety sits on the top of the skin, allowing for more effective absorption into the skin. When employed in skin care products and cosmetics, it boosts moisture activity while simultaneously enhancing the delivery of the formulation components into the skin. In an exemplary embodiment, the hydrating agent includes PPG-24-glycereth-24.

Plant-based glycerides which are suitable hydrating agents include, but are not limited to, shea butter, cocoa butter, mango butter, jojoba butter, olive butter, aloe butter, and avocado butter.

Shea butter, also known as *butyrospermum parkii* butter, is a plant-based glyceride which is a fat extract from the nut of the African shea treat, and is widely used in cosmetics as a moisturizer, salve, or lotion. It is a complex fat that usually contains a combination of oleic acid, stearic acid, linoleic acid, palmitic acid, linoleic acid, and arachidic acid, as well as various amounts of vitamins A, E, and F. Shea butter melts at body temperature and is rapidly absorbed into the skin where it helps bind moisture and provide hydration. In an exemplary embodiment, the plant-based glyceride hydrating agent includes shea butter.

Fruit complexes which are suitable hydrating agents include various combinations of fruit extracts, which include, but are not limited to, pineapple extract, noni extract, acai extract, passion fruit extract, algae extract, rose hips extract, pomegranate extract, watermelon extract, lentil extract, and apple extract.

One natural fruit complex is a combination of *Citrullus lanatus* (watermelon) fruit extract, *lens esculenta* (lentil) fruit extract, and *pyrus malus* (apple). The watermelon extract provides citrulline, which is essential to the functioning of filaggrin, a critical part of the skin's own water based moisturizing complex. The lentil extract provides vitamin B5 and trisaccharide, while the apple extract provides polysaccharides, sodium lactate, and sodium PCA. In an exemplary embodiment the hydrating agent includes a fruit complex provided as a combination of *Citrullus lanatus* (watermelon) fruit extract, *lens esculenta* (lentil) fruit extract, and *pyrus malus* (apple) fruit extract.

Sodium PCA, also known as sodium pyroglutamate, is the sodium salt of pyroglutamic acid. When topically applied, sodium PCA increases the water content of the top layer of the skin by drawing moisture from the air. It binds skin cells together by moisturizing them and enhancing the appearance of the surface it is applied to. One source of sodium PCA is apple extract.

Acquacell, available from Barnet Products, is a commercial source of *Citrullus lanatus* (watermelon) fruit extract, *lens esculenta* (lentil) fruit extract, and *pyrus malus* (apple) extract, which provides sodium lactate and sodium PCA, in an optimized delivery system of water and glycerin, and the preservatives potassium sorbate and sodium phosphate. Acquacell has been shown to provide lasting hydration from a single application, and has also been shown to significantly reduce fine lines in hours.

Cosmetic Compositions

In an embodiment, the cosmetic composition includes a Vitamin C compound, a peptide, an antioxidant, and a hydrating agent. The composition contains other components and excipients as described further below.

In an embodiment, the cosmetic composition includes 3-O-ethyl ascorbic acid, a peptide, an antioxidant, and a hydrating agent. In another embodiment, the cosmetic composition includes *Terminalia ferdinandiana* fruit extract, a peptide, an antioxidant, and a hydrating agent. In another embodiment, the cosmetic composition includes 3-O-ethyl ascorbic acid, *Terminalia ferdinandiana* fruit extract, a peptide, an antioxidant, and a hydrating agent.

In an embodiment, the cosmetic composition includes a Vitamin C compound, nonapeptide-1, an antioxidant, and a hydrating agent.

In an embodiment, the cosmetic composition includes a Vitamin C compound, a peptide, troxerutin, and a hydrating agent. In an embodiment, the cosmetic composition includes a Vitamin C compound, a peptide, *Polygonum aviculare* extract, and a hydrating agent. In an embodiment, the cosmetic composition includes a Vitamin C compound, a peptide, *Cistus monspeliensis* flower, leaf, and stem extract, and a hydrating agent. In an embodiment, the cosmetic composition includes a Vitamin C compound, a peptide, troxerutin, *Polygonum aviculare* extract, and a hydrating agent. In an embodiment, the cosmetic composition includes a Vitamin C compound, a peptide, troxerutin, *Cistus monspeliensis* flower, leaf, and stem extract, and a hydrating agent. In an embodiment, the cosmetic composition includes a Vitamin C compound, a peptide, *Polygonum aviculare* extract, *Cistus monspeliensis* flower, leaf, and stem extract, and a hydrating agent. In an embodiment, the cosmetic composition includes a Vitamin C compound, a peptide, troxerutin, *Polygonum aviculare* extract, *Cistus monspeliensis* flower, leaf, and stem extract, and a hydrating agent.

In an embodiment, the cosmetic composition includes a Vitamin C compound, a peptide, an antioxidant, and PPG-24-glycereth-24.

In an embodiment, the cosmetic composition includes a Vitamin C compound, a peptide, an antioxidant, a plant-based glyceride, and a fruit complex. In an embodiment the cosmetic composition includes a Vitamin C compound, a peptide, an antioxidant, shea butter, and a fruit complex. In an embodiment, the cosmetic composition includes a Vitamin C compound, a peptide, an antioxidant, a plant-based glyceride, *Citrullus lanatus* (watermelon) fruit extract, *lens esculenta* (lentil) fruit extract, and *pyrus malus* (apple) fruit extract. In an embodiment, the cosmetic composition includes a Vitamin C compound, a peptide, an antioxidant, shea butter, *Citrullus lanatus* (watermelon) fruit extract, *lens esculenta* (lentil) fruit extract, and *pyrus malus* (apple) fruit extract.

In a preferred embodiment, the composition contains 3-O-ethyl ascorbic acid, *Terminalia ferdinandiana* fruit extract, troxerutin, *Polygonum aviculare* extract, *Cistus monspeliensis* flower, leaf, and stem extract, nonapeptide-1, and PPG-24-glycereth-24.

In an embodiment, the combination of 3-O-ethyl ascorbic acid, *Terminalia ferdinandiana* fruit extract, troxerutin, *Polygonum aviculare* extract, *Cistus monspeliensis* flower, leaf, and stem extract, nonapeptide-1, and PPG-24-glycereth-24 is about 10% by weight of the composition.

In an exemplary embodiment, the combination of 3-O-ethyl ascorbic acid, *Terminalia ferdinandiana* fruit extract, troxerutin, *Polygonum aviculare* extract, *Cistus monspeliensis* flower, leaf, and stem extract, nonapeptide-1, and PPG-24-glycereth-24 is about 5.00% by weight of the composition.

In embodiments, the composition contains 3-O-ethyl ascorbic acid, troxerutin, *Polygonum aviculare* extract, *Cistus monspeliensis* flower, leaf, and stem extract, nonapeptide-1, shea butter, *Citrullus lanatus* (watermelon) fruit extract, *lens esculenta* (lentil) fruit extract, and *pyrus malus* (apple) fruit extract.

In an embodiment, the combination of 3-O-ethyl ascorbic acid, troxerutin, *Polygonum aviculare* extract, *Cistus monspeliensis* flower, leaf, and stem extract, nonapeptide-1, shea butter, *Citrullus lanatus* (watermelon) fruit extract, *lens esculenta* (lentil) fruit extract, and *pyrus malus* (apple) fruit extract is about 2.25% by weight of the composition.

Excipients, Other Components, and Solvents

Any embodiment of the invention can include solvents, other components, and dermatological excipients known to be useful in the manufacture of cosmetic compositions. Some excipients identified herein may also add to the benefits of the invention as presently described, for example by further improving hydration. Excipients and other components can include a. Emulsifiers, including nonionic, cationic, anionic or polymeric emulsifiers.
b. Rheology modifiers.
c. Humectants.
d. Surfactants, including, non-ionic, cationic and anionic surfactants.
e. Emollients.
f. pH modifiers and buffers.
g. Antimicrobial agents.
h. Aromas including fruit or plant extracts, for example in the form of fragrances or essential oils.
i. Additional antioxidants.
j. Additional skin care antiaging/anti-wrinkle agents.
k. Film-forming agents.
l. FD&C colors In an exemplary embodiment, the one or more dermatological excipients is selected from propanediol, 1,2-hexanediol, caprylhydroxamic acid, glycerin, yellow 6, PPG-26-buteth-26, PEG-40 hydrogenated castor oil, sodium phosphate, caprylyl glycol, disodium phosphate, sodium polyacryloyldimethyl taurate, fragrance, maltodextrin, disodium EDTA, citric acid, and combinations thereof.

In another exemplary embodiment, the one or more dermatological excipients is selected from dicaprylyl carbonate, trimethylolpropane tricaprylate/tricaprate, tridecyl trimellitate, propanediol, 1,2-hexanediol, caprylhydroxamic acid, butylene glycol, yellow 5, yellow 6, glycerin, dimethicone, polysilicone-11, cetearyl alcohol, cetearyl glucoside, sodium phosphate, caprylyl glycol, disodium phosphate, polyglceryl-3 methylglucose distearate, ammonium acryloyldimethyltaurate/beheneth-25 methacrylate crosspolymer, polyacrylate crosspolymer-6, maltodextrin, sodium lactate, sodium PCA, potassium sorbate, sodium benzoate, disodium EDTA, citric acid, sodium citrate, fragrance, and combinations thereof.

Embodiments of the invention also include solvents. In exemplary embodiments, more than about 80% of the composition comprises one or more solvents. Solvents include water and water soluble solvents, and water immiscible solvents. Water and water soluble solvents include, for example alcohols such as ethanol propanol, isopropanol, glycerin, and mixtures thereof. Water immiscible solvents include oils and waxes. As used herein, an oil is a water insoluble solvent such as mineral oil, vegetable oils and silicone oils, such as dimethicone and cyclomethicone. In exemplary embodiments, the composition includes water and/or water soluble solvents, and oils and/or water immiscible solvents.

According to the invention, the composition can be an emulsion, such as an oil-in-water emulsion or water-in-oil emulsion. The oil in the emulsion may be a carbon or hydrocarbon based oil or a silicone based oil, i.e. a silicone emulsion. The compositions can also be a solution, for example an aqueous solution, or a suspension in water or oil.

An exemplary oil-in-water emulsion contains about 60 wt %-90 wt % purified water and water soluble components and about 10 wt % to about 40 wt % components forming a water immiscible or oil phase. "Purified water" is water that does not contain ingredients which would be harmful to, or would cause adverse reactions to, the skin of a subject, such as a human. Distilled water and/or deionized water can be used.

In embodiments, the composition is a fluid or semi-fluid formulation, such as a cream, lotion, or serum.

In exemplary embodiments, the composition is a serum or gel-cream. Serum, as used herein, refers to a product that is rapidly absorbed and penetrates into deeper layers of the skin. Serums typically have a light low viscosity, non-greasy finish and high concentrations of active ingredients. Gel-cream, as used here, contains a gel component and a cream component. A gel-cream ha hybrid properties of both a gel and a cream.

In some embodiments, the composition comprises at least about 60% water by weight. In embodiments the composition comprises at least about 70% water by weight. In embodiments, the composition comprises at least about 80% water by weight.

In some embodiments, the composition is an oil-in-water emulsion. In some embodiments, the composition is a gel-cream.

In some embodiments, the composition does not cause skin irritation or discomfort upon or following topical application.

Uses

In one aspect, the invention is a method of brightening skin, evening skin tone, tightening skin, plumping skin, and reducing fine lines and wrinkles. These improvements may be in the form of visible improvements in the appearance of the skin are achieved by topically administering to the skin a cosmetic composition containing: a Vitamin C compound, a peptide, an antioxidant, and a hydrating agent, as described herein.

In some embodiments, the method entails applying the composition to cleansed skin.

In some embodiments, the cleansed skin is skin of the face and/or neck.

In some embodiments, the method entails applying the composition in the morning (i.e. A.M.) and/or in the evening (i.e. P.M.).

In an exemplary embodiment the cosmetic composition of the invention is applied to the skin at least once, and preferably twice, per day. When applying two times per day, it is preferred to administer once in the morning, and once in the evening. The formulation is applied by massaging it on the skin with fingers. After application, the formulation is allowed to absorb into the skin.

While a single application has been found to improve skin properties, repeated use further improves results. Similarly, repeated application (daily or twice a day) extends the improvement in skin properties. Visible and measurable improvements in skin qualities are observed immediately after a single use, and increase when used twice daily for one week and twice daily for four weeks.

Manufacturing Procedure for Serum

Disclosed below is an exemplary manufacturing procedure for preparation of a serum formulation according to the present invention.

PHASE A

1) To begin preparing a batch, into a main processing tank add purified water and stir at a speed sufficient to obtain a vortex.

2) Sequentially add into the main processing tank disodium EDTA; propanediol; sodium polyacryloyldimethyl taurate; caprylhydroxamic acid; and 1,2-hexahnediol, allowing time for each ingredient to fully disperse in the batch. A uniform gel will form upon addition of the ingredients. Ensure sodium polyacryloyldimethyl taurate is fully hydrated by checking for and eliminating fish eyes.

3) Mix for 10-20 minutes with side sweeping.

4) Sequentially add into the main processing tank, allowing time for each ingredient to fully go into the batch: troxerutin; maltodextrin, *Cistus monspeliensis* flower/leaf/stem extract; *Terminalia ferdinandiana* fruit extract; water; glycerin; potassium sorbate; sodium benzoate; *Polygnum aviculare* extract; sodium phosphate; nonapeptide-1, disodium phosphate; and caprylyl glycol.

5) Mix for 10-20 minutes with side sweeping. Do not aerate. Cool to 27° C. if necessary.

PHASE B

1) Into a secondary processing tank add PPG-4 Glycereth-24 and 3-O-ethyl ascorbic acid.

2) Mix until the mixture is a uniform to obtain Phase B.

3) Add Phase B into Phase A to obtain a first intermediate phase of the batch in the main processing tank.

PHASE C

1) Heat a mixture of PPG-26 Buteth-26, PEG-40 hydrogenated castor oil, and water to 50° C., then cool to 25° C., and then add fragrance.

2) Mix for 5 minutes to obtain Phase C.

3) Add Phase C into the first intermediate phase in the main process tank and mix for 10-20 minutes with side sweeping to obtain a second intermediate phase of the batch in the main processing tank.

PHASE D

1) Add a 0.1% aqueous solution of Yellow 6 into the batch.

2) Add citric acid into the batch until a pH of 4.15-4.35 is achieved to obtain the serum formulation.

Bottle and package the serum formulation.

Manufacturing Procedure for Gel-Cream

Disclosed below is an exemplary manufacturing procedure for preparation of a gel-cream formulation according to the present invention.

PHASE A

1) To begin preparation of a batch, into a main processing tank add purified water and stir at a high speed.

2) Sequentially add into the main processing disodium EDTA; Polyacrylate Crosspolymer-6; caprylhydroxamic acid; 1,2-hexahnediol; and Propanediol tank, allowing time for each ingredient to fully disperse into the batch. Mix until all solids are dissolved or dispersed and the batch is uniform.

3) Heat to 80° C. and hold to obtain Phase A.

PHASE B

1) Into a secondary processing tank combine, with mixing: Tridecyl Trimellitate; Trimethylolpropane Tricaprylate/Tricaprate; Dicaprylyl Carbonate; Dimethicone; Polysilicone-11; Butyrospermum *Parkii* (Shea) Butter; Cetearyl Alcohol; Cetearyl Glucoside; Polyglyceryl-3 Methylglucose Distearate; and sift in Ammonium Acryloyldimethyltaurate/Beheneth-25 Methacrylate Crosspolymer.

2) Heat to 80° C. with mixing until waxes are melted (about 20 minutes or less) and hold to obtain Phase B.

3) Add Phase B into Phase A and propeller mix for 30 minutes or until uniform to obtain a first intermediate phase of the batch in the main processing tank. 4) Cool batch to 45° C. and hold.

PHASE C

1) Add to the first intermediate phase one by one with mixing: troxerutin; Water; Glycerin; *Citrullus* Vulgaris (Watermelon) Fruit Extract; *Pyrus Malus* (Apple) Fruit Extract; Lens *Esculenta* (Lentil) Fruit Extract; Sodium PCA; Sodium Lactate; Barnet; maltodextrin; *Cistus monspeliensis* flower/leaf/stem extract; potassium sorbate; sodium benzoate; *Polygnum aviculare* extract; sodium phosphate; nonapeptide-1; disodium phosphate; and caprylyl glycol.

2) Mix for 20 minutes or until uniform while maintaining at 45° C. to obtain a second intermediate phase of the batch in the main processing tank.

PHASE D

1) Premix 1,3 Butylene Glycol and 3-O-Ethyl Ascorbic Acid until uniform and add to second intermediate phase of the batch in the main processing tank.

2) Mix for 20 minutes or until uniform while maintaining at 45° C. to obtain a third intermediate phase of the batch in the main processing tank.

PHASE E

1) Add Fragrance and 0.1% aqueous solution of Yellow 6 to the third intermediate phase.

2) Mix for 20 minutes or until uniform while maintaining at 45° C. to obtain a fourth intermediate phase in the main processing tank.

PHASE F

1) Add to the fourth intermediate phase sodium citrate and citric acid in quantities sufficient to achieve a pH of 3.67-4.67. Add water if necessary.

2) Mix for 15 minutes or until uniform while maintaining batch at 45° C.

3) Cool to 35° C. to obtain the gel-cream.

Fill jars with the gel-cream formulation.

Exemplary commercial sources of the above ingredients include, but are not limited to:

Versene NA Chelating Agent (i.e. disodium EDTA or tetrasodium EDTA; Dow Chemical);
Zemea (i.e. propanediol; DuPont);
Aristoflex Silk (i.e. sodium polyacryloyldimethyl taurate; Clariant);
Spectrastat PHL (i.e. caprylhydroxamic acid; 1,2-hexahnediol; and Propanediol; Inolex);
RonaCare Troxerutin (i.e. troxerutin; Rona/EMD);
Ciste'M BC10023 (i.e. maltodextrin, *Cistus monspeliensis* flower/leaf/stem extract; BASF);
Superox-C AF (i.e. glycerin; water; *Terminalia ferdinandiana* fruit extract; Lucas Meyer);
Elix-IR (i.e. water, glycerin, potassium sorbate, sodium benzoate, *Polygnum aviculare* extract; Lucas Meyer);
Dawnergy (i.e. water, sodium phosphate, nonapeptide-1, disodium phosphate, caprylyl glycol; Lipotec);
UAI14571/00 ROC SIMPLY CITRUS (i.e. fragrance; Givaudan).
FD&C Yellow #6 (i.e. a 0.1% aqueous solution of Yellow 6; Sensient).
1,3 Butylene Glycol from Nexeo;
AccessWhite VCE PPT (3-O-Ethyl Ascorbic Acid; Access Ingredients);
Acquacell (i.e. Water; Glycerin; *Citrullus* Vulgaris (Watermelon) Fruit Extract; *Pyrus Malus* (Apple) Fruit Extract; Lens *Esculenta* (Lentil) Fruit Extract; Sodium PCA; and Sodium Lactate; Barnet);
Liponate TDTM (i.e. Tridecyl Trimellitate; Vantage);
Lexfeel 21 (i.e. Trimethylolpropane Tricaprylate/Tricaprate; Inolex);
Cetiol CC (i.e. Dicaprylyl Carbonate; BASF);
Gransil SBG-11 (i.e. Dimethicone; Polysilicone-11; and Butyrospermum *Parkii* (Shea) Butter; Grant Industries);
Montanov 68 (i.e. Cetearyl Alcohol; and Cetearyl Glucoside; Seppic);
Tego Care 450 (i.e. Polyglyceryl-3 Methylglucose Distearate; Evonik);
Sepimax Zen (i.e. Polyacrylate Crosspolymer-6; Seppic);
Solubilistant LRI (i.e. PPG-26 Buteth-26, PEG-40 hydrogenated castor oil, water; BASF); and
Barsoft TXM (i.e. PPG-4 Glycereth-24; Barnet).

EXAMPLES

The following examples are provided for illustrative purposes only and are intended to be purely exemplary of the disclosure and are not intended to limit the scope of the invention.

Example 1

Table 1A provides exemplary amounts of the Vitamin C compound, peptide, antioxidant and hydrating agent components used in compositions of the invention. All weights are weight % unless otherwise specified.

TABLE 1A

General Formula

| Ingredient | Broadest Range Weight % | Exemplary Range Weight % |
| --- | --- | --- |
| Vitamin C compound | 0.90-3.00 | 0.90-1.15 |
| Peptide | 0.001-1.00 | 0.0045-0.0055 |
| Antioxidant | 0.01-3.00 | 0.10-1.25 |
| Hydrating agent | 0.75-3.25 | 0.90-3.00 |
| Water, solvent, and excipients | q.s. | q.s. |
| Total | 100.00 | 100.00 |

Table 1B is a daily serum composition according to an embodiment of the invention. All weights are weight % unless otherwise specified.

TABLE 1B

Daily Serum

| Ingredient | Weight % (±10%) |
| --- | --- |
| Water | 86.839 |
| Propanediol | 3.150 |
| 1,2-Hexanediol | 0.900 |
| Caprylhydroxamic Acid | 0.150 |
| PPG-24-Glycereth-24 | 3.000 |
| Glycerin | 1.580 |

TABLE 1B-continued

Daily Serum

| Ingredient | Weight % (±10%) |
|---|---|
| Terminalia Ferdinandiana Fruit Extract | 0.040 |
| Polygonum Aviculare Extract | 0.110 |
| Potassium Sorbate | 0.011 |
| Sodium Benzoate | 0.011 |
| Yellow 6 | 0.001 |
| PPG-26-Buteth-26 | 0.563 |
| PEG-40 Hydrogenated Castor Oil | 0.382 |
| Sodium Phosphate | 0.030 |
| Caprylyl Glycol | 0.010 |
| Nonapeptide-1 | 0.005 |
| Disodium Phosphate | 0.000008 |
| 3-O-Ethyl Ascorbic Acid | 1.000 |
| Troxerutin | 1.000 |
| Sodium Polyacryloyldimethyl Taurate | 0.630 |
| Fragrance* | 0.480 |
| Disodium EDTA | 0.100 |
| Maltodextrin | 0.080 |
| Cistus Monspeliensis Flower/Leaf/Stem Extract | 0.020 |
| Citric acid | qs |
| Total | 100 |

*Fragrance contains limonene, linalool, and citral

The formula of Table 1B was clinically evaluated (see Examples 2 and 3) and determined to deliver instant luminosity, and visibly firmer, more luminous skin with visibly reduced wrinkles in 4 weeks.

Table 1C is a daily gel-cream composition according to an embodiment of the invention. All weights are weight 00 unless otherwise specified.

TABLE 1C

Daily Gel-cream

| Ingredient | Weight % (±10%) |
|---|---|
| Water | 71.3146 |
| Disodium EDTA | 0.100 |
| Polyacrylate Crosspolymer-6 | 0.400 |
| Caprylhydroxamic Acid | 0.150 |
| 1,2-Hexanediol | 0.900 |
| Propanediol | 1.950 |
| Tridecyl Trimellitate | 4.000 |
| Trimethylolpropane Tricaprylate/Tricaprate | 5.000 |
| Dicaprylyl Carbonate | 6.000 |
| Dimethicone | 0.700 |
| Polysilicone-11 | 0.400 |
| Butyrospermum parkii (Shea) Butter | 0.900 |
| Cetearyl Alcohol | 0.800 |
| Cetearyl Glucoside | 0.800 |
| Polyglyceryl-3 Methylglucose Distearate | 0.800 |
| Ammonium Acryloyldimethyltaurate/Beheneth-25 Methacrylate Crosspolymer | 0.550 |
| Troxerutin | 0.100 |
| Glycerin | 0.265 |
| Citrullus Vulgaris (Watermelon) Fruit Extract | 0.0125 |
| Pyrus Malus (Apple) Fruit Extract (source of Sodium PCA and Sodium Lactate) | 0.0083 |
| Lens Esculenta (Lentil) Fruit Extract | 0.0086 |
| Maltodextrin | 0.080 |
| Cistus Monspeliensis Flower/Leaf/Stem Extract | 0.020 |
| Polygonum Aviculare Extract | 0.110 |
| Potassium Sorbate | 0.0113 |
| Sodium Benzoate | 0.0113 |
| Sodium Phosphate | 0.030 |
| Caprylyl Glycol | 0.010 |
| Nonapeptide-1 | 0.005 |
| Disodium Phosphate | 0.000008 |
| Butylene Glycol | 3.000 |
| 3-O-Ethyl Ascorbic Acid | 1.000 |

TABLE 1C-continued

Daily Gel-cream

| Ingredient | Weight % (±10%) |
|---|---|
| Fragrance* | 0.300 |
| Yellow 5 | 0.1394 |
| Yellow 6 | 0.26531 |
| Sodium Citrate | qs |
| Citric Acid | qs |
| Total | 100 |

*Fragrance contains limonene, linalool, and citral

Daily Serum Clinical Evaluations (Examples 2 and 3)

Clinical evaluations were conducted in accordance with the intent and purpose of Good Clinical Practice regulations described in 21 CFR Part 50 (Protection of Human Subjects-Informed Consent) and the Standard Operating Procedures of Essex Testing Clinic, Inc.

Informed consent was obtained from each subject in the study and documented in writing before participation. A copy of the Informed Consent was provided to each subject.

Test Subjects

A sufficient number of females, between 35-65 years of age (inclusive) and in general good health were empaneled so that at least 30 completed the study.

Subjects were instructed to smooth 3-4 drops of the daily serum of Example 1B over a cleansed face and neck 2 times daily (A.M. and P.M; i.e. morning and evening).

Example 2: Technician Evaluations

At baseline, after first use of the product, and after 1, 4, and 8 weeks of product use, a trained technician evaluated the appearance of skin of the subjects based on the following parameters.

Example 2A: Skin Radiance/Luminosity

This study discloses a clinical evaluation studying improvement in skin radiance/luminosity following application to the face of the daily serum of Example 1B.

A trained technician evaluated the appearance of skin radiance/luminosity on the face of each subject according to the scale below:

0=No dullness present/perfectly luminous complexion 1-3=Slightly dull appearance 4-6=Moderately dull appearance 7-9=Severely dull appearance Table 2A below presents a summary of the skin radiance/luminosity technician evaluation.

TABLE 2A

Skin Radiance/Luminosity Technician Evaluation

| | Mean ± S.D. | p-value | Mean Change form Baseline | % of Subjects with Improvements from Baseline |
|---|---|---|---|---|
| Baseline | 6.8 ± 1.1 | — | — | — |
| Immediately Post-Application | 4.8* ± 1.2 | <0.001 | −29.4% | 94% |
| Week 1 | 4.7* ± 1.1 | <0.001 | −30.9% | 97% |
| Week 4 | 4.4* ± 1.0 | <0.001 | −35.3% | 100% |
| Week 8 | 4.2* ± 0.9 | <0.001 | −38.2% | 100% |

*Statistically significant difference from baseline, $p \leq 0.05$

The improvements were highly significant compared with the baseline, with improvements of 29.4%, 30.9%, 35.3%, and 38.2% after first use, 1, 4, and 8 weeks of product use, respectively.

Example 2B: Skin Texture Study

This study discloses a clinical evaluation studying improvement in skin texture following application to the face of the daily serum of Example 1B.

A trained technician evaluated the appearance of skin texture on the face of each subject according to the scale below:
0=None
1-3=Slightly rough skin texture
4-6=Moderately rough skin texture
7-9=Severely rough skin texture Table 2B below presents a summary of the skin radiance/luminosity technician evaluation.

TABLE 2B

Skin Texture Technician Evaluation

| | Mean ± S.D. | p-value | Mean Change form Baseline | % of Subjects with Improvements from Baseline |
|---|---|---|---|---|
| Baseline | 5.5 ± 0.7 | — | — | — |
| Immediately Post-Application | 4.8* ± 0.6 | <0.001 | −12.7% | 59% |
| Week 1 | 4.2* ± 0.6 | <0.001 | −23.6% | 97% |
| Week 4 | 3.9* ± 0.6 | <0.001 | −29.1% | 97% |
| Week 8 | 3.4* ± 0.5 | <0.001 | −38.2% | 100% |

*Statistically significant difference from baseline, $p \leq 0.05$

The improvements were highly significant compared with the baseline, with improvements of 12.7%, 23.6%, 29.1%, and 38.2% after first use, 1, 4, and 8 weeks of product use, respectively.

Example 2C: Skin Clarity/Hyperpigmentation

This study discloses a clinical evaluation studying improvement in skin clarity/hyperpigmentation following application to the face of the daily serum of Example 1B.

A trained technician evaluated the appearance of skin clarity/hyperpigmentation on the face of each subject according to the scale below:
0=Perfectly even skin tone
1-3=Slight areas of uneven skin tone/hyperpigmentation visible
4-6=Moderate areas of uneven skin tone/hyperpigmentation visible
7-9=Severe areas of uneven skin tone/hyperpigmentation visible Table 2C below presents a summary of the skin clarity/hyperpigmentation technician evaluation.

TABLE 2C

Skin Clarity/Hyperpigmentation Technician Evaluation

| | Mean ± S.D. | p-value | Mean Change form Baseline | % of Subjects with Improvements from Baseline |
|---|---|---|---|---|
| Baseline | 6.9 ± 1.0 | — | — | — |
| Immediately Post-Application | 6.9 ± 1.0 | 1.000 | 0% | 0% |
| Week 1 | 6.9 ± 1.0 | 1.000 | 0% | 0% |
| Week 4 | 6.5* ± 1.0 | <0.001 | −5.8% | 47% |
| Week 8 | 6.4* ± 0.9 | <0.001 | −7.2% | 59% |

*Statistically significant difference from baseline, $p \leq 0.05$

The improvements were highly significant compared with the baseline, with improvements of 5.8 and 7.2% after 4 and 8 weeks of product use, respectively.

Example 2D: Global Facial Fine Lines/Wrinkles (Plumpness)

This study discloses a clinical evaluation studying improvement in global facial fine lines/wrinkles (plumpness) following application to the face of the daily serum of Example 1B.

A trained technician evaluated the appearance of global fine lines and wrinkles on the face of each subject according to the scale below:
0=None
1-3=Slight
4-6=Noticeable
7-9=Very noticeable Table 2D below presents a summary of the global fine lines/wrinkles technician evaluation.

TABLE 2D

Global Facial Fine Lines/Wrinkles Technician Evaluation

| | Mean ± S.D. | p-value | Mean Change form Baseline | % of Subjects with Improvements from Baseline |
|---|---|---|---|---|
| Baseline | 8.2 ± 0.9 | — | — | — |
| Immediately Post-Application | 8.2 ± 0.9 | 1.000 | 0% | 0% |
| Week 1 | 8.2 ± 0.9 | 1.000 | 0% | 0% |
| Week 4 | 8.1 ± 0.9 | 0.325 | −1.2% | 3% |
| Week 8 | 8.1 ± 0.9 | 0.325 | −1.2% | 3% |

*Statistically significant difference from baseline, $p \leq 0.05$

There were improvements of 1.2% after 4 and 8 weeks. The improvements were not statistically significant. There were no changes after immediate use or 1 week.

Example 2E: Skin Elasticity

This study discloses a clinical evaluation studying improvement in skin elasticity following application to the face of the daily serum of Example 1B.

A trained technician measured skin elasticity on the face of each subject using the Cutometer® R2 parameter. An increase in Cutometer® R2 measurements indicates an improvement (increase) in skin elasticity. A decrease represents a worsening.

Table 2E below presents a summary of the skin elasticity Cutometer® R2 measurements.

TABLE 2E

Skin Elasticity Cutometer ® R2 Measurements

|  | Mean ± S.D. | p-value | Mean Change form Baseline | % of Subjects with Improvements from Baseline |
|---|---|---|---|---|
| Baseline | 0.40 ± 0.069 | — | — | — |
| Immediately Post-Application | 0.565* ± 0.112 | <0.001 | 39.9% | 100% |
| Week 1 | 0.506* ± 0.104 | <0.001 | 25.2% | 100% |
| Week 4 | 0.560* ± 0.096 | <0.001 | 38.6% | 100% |
| Week 8 | 0.562* ± 0.101 | <0.001 | 39.1% | 100% |

*Statistically significant difference from baseline, $p \leq 0.05$

The improvements were highly significant compared with the baseline, with improvements of 39.9%, 25.2%, 38.6%, and 39.1% after first use, 1, 4, and 8 weeks of product use, respectively.

Example 2F: Skin Firmness

This study discloses a clinical evaluation studying improvement in skin firmness following application to the face of the daily serum of Example 1B.

A trained technician measured skin firmness on the face of each subject using the Cutometer® R0 parameter. A decrease in Cutometer® R0 measurements indicates an improvement (increase) in skin firmness. An increase represents a worsening.

Table 2F below presents a summary of the skin elasticity Cutometer® R2 measurements.

TABLE 2F

Skin Firmness Cutometer ® R0 Measurements

|  | Mean ± S.D. | p-value | Mean Change form Baseline | % of Subjects with Improvements from Baseline |
|---|---|---|---|---|
| Baseline | 0.161 ± 0.077 | — | — | — |
| Immediately Post-Application | 0.199 ± 0.093 | 0.061 | 23.6% | 38% |
| Week 1 | 0.216* ± 0.068 | 0.001 | 34.2% | 32% |
| Week 4 | 0.125* ± 0.042 | 0.016 | −22.4% | 68% |
| Week 8 | 0.125* ± 0.043 | 0.010 | −22.4% | 74% |

*Statistically significant difference from baseline, $p \leq 0.05$

The improvements were statistically significant compared with the baseline, with improvements of 22.4% after 4 and 8 weeks of product use.

Example 2G: Skin Hydration

This study discloses a clinical evaluation studying improvement in skin hydration following application to the face of the daily serum of Example 1B.

A trained technician measured skin hydration on the face of each subject using the Corneometer® measurements. An increase in Corneometer® measurements indicates an improvement (increase) in skin moisture. A decrease represents a worsening.

Table 2H below presents a summary of the skin hydration Corneometer® measurements.

TABLE 2G

Skin Hydration Corneometer ® Measurements

|  | Mean ± S.D. | p-value | Mean Change form Baseline | % of Subjects with Improvements from Baseline |
|---|---|---|---|---|
| Baseline | 44.1 ± 8.8 | — | — | — |
| Immediately Post-Application | 64.8* ± 9.0 | <0.001 | 46.9% | 100% |
| Week 1 | 60.6* ± 9.6 | <0.001 | 37.4% | 100% |
| Week 4 | 60.8* ± 10.2 | <0.001 | 37.9% | 94% |
| Week 8 | 60.6* ± 10.4 | <0.001 | 37.4% | 97% |

*Statistically significant difference from baseline, $p \leq 0.05$

The improvements were highly significant compared with the baseline, with improvements of 46.9%, 37.4%, 37.9%, and 37.4% after first use, 1, 4, and 8 weeks of product use.

Example 2H: Skin Irritation Study

This study discloses a clinical evaluation studying unwanted skin irritation following application to the face of the daily serum of Example 1B.

At each visit, a trained technician evaluated the face of each subject for irritation according to the scale below:
0=No evidence of any irritation
+=Barely perceptible irritation present
1=Mild irritation present
2=Moderate irritation present
3=Marked irritation present
4=Severe irritation present The individual subject evaluation results are disclosed in Table 2H below:

TABLE 2H

Skin Irritation Technical Evaluation

| Subject No. | Baseline | Immediate | Week 1 | Week 4 | Week 8 |
|---|---|---|---|---|---|
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 0 |
| 11 | 0 | 0 | 0 | 0 | 0 |
| 12 | 0 | 0 | 0 | 0 | 0 |
| 13 | 0 | 0 | 0 | 0 | 0 |
| 14 | 0 | 0 | 0 | 0 | 0 |
| 15 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |
| 25 | 0 | 0 | 0 | 0 | 0 |
| 26 | 0 | 0 | 0 | 0 | 0 |
| 27 | 0 | 0 | 0 | 0 | 0 |
| 28 | 0 | 0 | 0 | 0 | 0 |

TABLE 2H-continued

Skin Irritation Technical Evaluation

| Subject No. | Baseline | Immediate | Week 1 | Week 4 | Week 8 |
|---|---|---|---|---|---|
| 29 | 0 | 0 | 0 | 0 | 0 |
| 30 | 0 | 0 | 0 | 0 | 0 |
| 31 | 0 | 0 | 0 | 0 | 0 |
| 32 | 0 | 0 | 0 | 0 | 0 |
| 33 | 0 | 0 | 0 | 0 | 0 |
| 34 | 0 | 0 | 0 | 0 | 0 |
| MEAN | 0.0 | 0.0 | 0.0 | 0.0 | 0.0 |

There was no irritation observed on any subject during the course of the study.

Example 3: Clinical Evaluations—Image Analysis

At baseline, after first use of the product, and after 1, 4, and 8 weeks of use of the daily serum of Example 1B, a trained technician took digital images of the face of each subject. Using ImagePro® software, the images were analyzed to determine changes in the appearance of skin radiance/luminosity, skin texture/smoothness, skin clarity/hyperpigmentation, and global facial fine lines/wrinkles (plumpness).

Example 3A: Skin Radiance/Luminosity Study

In order to determine changes in skin radiance/luminosity, facial luminance was analyzed. Facial luminance is a single number calculated based on the uniformity of the lightening of the image. An increase in the facial luminance score represents an improvement in overall skin luminance. A decrease represents a worsening.

Table 3A below presents a summary of the skin radiance/luminosity image analysis.

TABLE 3A

Skin Radiance/Luminosity Image Analysis

| | Mean ± S.D. | p-value | Mean Change form Baseline | % of Subjects with Improvements from Baseline |
|---|---|---|---|---|
| Baseline | 126.3 ± 14.5 | — | — | — |
| Immediately Post-Application | 125.7 ± 14.6 | 0.396 | −0.5% | 47% |
| Week 1 | 127.2 ± 14.6 | 0.151 | 0.7% | 62% |
| Week 4 | 129.0* ± 14.7 | <0.001 | 2.1% | 76% |
| Week 8 | 128.7* ± 11.9 | 0.041 | 1.9% | 68% |

*Statistically significant difference from baseline, $p \leq 0.05$

Despite an initial decline in skin radiance/luminosity immediately post-application, mean improvements of 0.7%, 2.1%, and 1.9% were observed after 1, 4, and 8 weeks, respectively. The improvements after 4 and 8 weeks were statistically significant.

Example 3B: Skin Texture Study

In order to determine changes in skin texture/smoothness, each digital image was scanned horizontally and vertically to collect the red, green, and blue intensities of the pixels. The proprietary mathematical algorithm in Visia CR® uses the pixel intensities of the scanned areas to calculate the texture score based on the totals of the mean intensities of the red, green, and blue pixels. Texture scores are a single number calculated based on skin features. A decrease in the texture score represents an improvement in overall skin texture. An increase represents a worsening.

Table 31B below presents a summary of the skin texture/smoothness image analysis.

TABLE 3B

Skin Texture/Smoothness Image Analysis

| | Mean ± S.D. | p-value | Mean Change form Baseline | % of Subjects with Improvements from Baseline |
|---|---|---|---|---|
| Baseline | 252.5 ± 26.8 | — | — | — |
| Immediately Post-Application | 289.5* ± 32.1 | <0.001 | 14.7% | 6% |
| Week 1 | 255.6 ± 29.2 | 0.308 | 1.2% | 41% |
| Week 4 | 259.3* ± 27.8 | 0.036 | 2.7% | 38% |
| Week 8 | 266.8* ± 27.5 | <0.001 | 5.7% | 26% |

*Statistically significant difference from baseline, $p \leq 0.05$

Despite the means indicating a negative outcome on skin texture/smoothness, 6%, 41%, 38%, and 26% of patients observed improvements in skin texture/smoothness after first use, 1, 4, and 8 weeks of use, respectively.

Example 3C: Skin Clarity/Hyperpigmentation

In order to determine changes in skin clarity/hyperpigmentation, chroma was analyzed. The degree to which a color is free from being mixed with other colors is a good indication of its chromacity. An increase in the chroma score represents an improvement in skin clarity/hyperpigmentation. A decrease represents a worsening.

Table 3C below presents a summary of the skin clarity/hyperpigmentation image analysis.

TABLE 3C

Skin Clarity/Hyperpigmentation Image Analysis

| | Mean ± S.D. | p-value | Mean Change form Baseline | % of Subjects with Improvements from Baseline |
|---|---|---|---|---|
| Baseline | 25.2 ± 6.1 | — | — | — |
| Immediately Post-Application | 25.8* ± 6.3 | <0.001 | 2.4% | 75% |
| Week 1 | 24.9 ± 6.1 | 0.277 | −1.2% | 44% |
| Week 4 | 24.8* ± 6.1 | 0.041 | −1.6% | 29% |
| Week 8 | 25.9* ± 5.6 | 0.045 | 2.8% | 76% |

*Statistically significant difference from baseline, $p \leq 0.05$

There were declines in Skin Clarity/Hyperpigmentation of 1.2% and 1.60% after 1 and 4 weeks, respectively. There were mean improvements of 2.4%0 and 2.8% after immediate use of the product and 8 weeks, respectively. The changes after immediate use, 4 weeks, and 8 weeks were statistically significant.

Example 3D: Global Facial Fine Lines/Wrinkles (Plumpness)

In order to determine changes in global facial fine lines/wrinkles, each digital image was scanned horizontally and vertically to collect the red, green, and blue intensities of the pixels. The proprietary mathematical algorithm in Visia CR® uses the pixel intensities of the scanned areas to calculate the texture score based on the totals of the mean intensities of the red, green, and blue pixels. Texture scores are a single number calculated based on skin features. A decrease in the texture score represents an improvement (or decrease) in the appearance of global facial fine lines/wrinkles.

Table 3D below presents a summary of the global facial fine lines/wrinkles image analysis.

TABLE 3D

Global Facial Fine Lines/Wrinkles Image Analysis

| | Mean ± S.D. | p-value | Mean Change form Baseline | % of Subjects with Improvements from Baseline |
|---|---|---|---|---|
| Baseline | 1142.3 ± 538.7 | — | — | — |
| Immediately Post-Application | 919.8* ± 315.0 | <0.001 | −19.5% | 100% |
| Week 1 | 835.0* ± 278.8 | <0.001 | −26.9% | 97% |
| Week 4 | 811.8* ± 214.1 | <0.001 | −28.9% | 100% |
| Week 8 | 733.3* ± 150.3 | <0.001 | −35.8% | 100% |

*Statistically significant difference from baseline, $p \leq 0.05$

The improvements were highly significant compared with the baseline, with improvements of 19.5%, 26.9%, 28.1%, and 35.8% after first use, 1, 4, and 8 weeks of product use, respectively.

Conclusions

These clinical efficacy studies indicate the serum of Example 1B delivers instant luminosity and improved skin elasticity.

Within 1 week, the serum visibly improved skin texture.

And within 4 weeks skin appears brighter and tighter, skin tone is visibly more even, and there is a visible reduction in fine lines and wrinkles.

The serum accomplishes and enhances the effects of Vitamin C without any unwanted irritation.

Gel-Cream Clinical Evaluations (Examples 4 and 5)

Clinical evaluations were conducted in accordance with the intent and purpose of Good Clinical Practice regulations described in 21 CFR Part 50 (Protection of Human Subjects-Informed Consent) and the Standard Operating Procedures of Essex Testing Clinic, Inc.

Informed consent was obtained from each subject in the study and documented in writing before participation. A copy of the Informed Consent was provided to each subject.

Test Subjects

A sufficient number of females, between 35-65 years of age (inclusive) and in general good health were empaneled so that at least 30 completed the study.

Subjects were instructed to smooth the gel-cream of Example 1C over a cleansed face and neck 2 times daily (A.M. and P.M; i.e. morning and evening).

Example 4: Technician Evaluations

At baseline, immediately after first use of the product, after 24 hours, 1 week, 4 weeks, and 8 weeks of product use, a trained technician evaluated the appearance of skin of the subjects based on the following parameters.

Example 4A: Skin Radiance/Luminosity

This study discloses a clinical evaluation studying improvement in skin radiance/luminosity following application to the face of the gel-cream of Example 1C.

A trained technician evaluated the appearance of skin radiance/luminosity on the face of each subject according to the scale below:
0=No dullness present/perfectly luminous complexion
1-3=Slightly dull appearance
4-6=Moderately dull appearance
7-9=Severely dull appearance Table 4A below presents a summary of the skin radiance/luminosity technician evaluation.

TABLE 4A

Skin Radiance/Luminosity Technician Evaluation

| | Mean ± S.D. | p-value | Mean Change form Baseline | % of Subjects with Improvements from Baseline |
|---|---|---|---|---|
| Baseline | 6.6 ± 0.6 | — | — | — |
| Immediately Post-Application | 5.6* ± 0.5 | <0.001 | −15.2% | 97% |
| 24 Hours | 5.4* ± 0.6 | <0.001 | −18.2 | 94% |
| Week 1 | 4.9* ± 0.7 | <0.001 | −25.8% | 100% |
| Week 4 | 4.9* ± 0.7 | <0.001 | −25.8% | 100% |
| Week 8 | 4.3* ± 0.6 | <0.001 | −34.8% | 100% |

*Statistically significant difference from baseline, $p \leq 0.05$

The improvements were highly significant compared with the baseline, with improvements of 15.2%, 18.2%, 25.8%, 25.8%, and 34.8% after first use, 24 hours, 1 week, 4 weeks, and 8 weeks of product use, respectively.

Example 4B: Skin Texture Study

This study discloses a clinical evaluation studying improvement in skin texture following application to the face of the gel-cream of Example 1C.

A trained technician evaluated the appearance of skin texture on the face of each subject according to the scale below:
0=None
1-3=Slightly rough skin texture
4-6=Moderately rough skin texture
7-9=Severely rough skin texture Table 4B below presents a summary of the skin radiance/luminosity technician evaluation.

TABLE 4B

Skin Texture Technician Evaluation

| | Mean ± S.D. | p-value | Mean Change form Baseline | % of Subjects with Improvements from Baseline |
|---|---|---|---|---|
| Baseline | 6.2 ± 0.4 | — | — | — |
| Immediately Post-Application | 5.2* ± 0.4 | <0.001 | −16.1% | 100% |
| 24 Hours | 5.0* ± 0.6 | <0.001 | −19.4 | 100% |
| Week 1 | 4.5* ± 0.8 | <0.001 | −27.4% | 100% |

TABLE 4B-continued

Skin Texture Technician Evaluation

|  | Mean ± S.D. | p-value | Mean Change form Baseline | % of Subjects with Improvements from Baseline |
|---|---|---|---|---|
| Week 4 | 4.4* ± 0.7 | <0.001 | −29.0% | 100% |
| Week 8 | 3.8* ± 0.6 | <0.001 | −38.7% | 100% |

*Statistically significant difference from baseline, p ≤ 0.05

The improvements were highly significant compared with the baseline, with improvements of 16.1%, 19.4%, 27.4%, 29.0%, and 38.7% after first use, 24 hours, 1 week, 4 weeks, and 8 weeks of product use, respectively.

Example 4C: Skin Clarity/Hyperpigmentation

This study discloses a clinical evaluation studying improvement in skin clarity/hyperpigmentation following application to the face of the gel-cream of Example 1C.

A trained technician evaluated the appearance of skin clarity/hyperpigmentation on the face of each subject according to the scale below:
0=Perfectly even skin tone
1-3=Slight areas of uneven skin tone/hyperpigmentation visible
4-6=Moderate areas of uneven skin tone/hyperpigmentation visible
7-9=Severe areas of uneven skin tone/hyperpigmentation visible Table 4C below presents a summary of the skin clarity/hyperpigmentation technician evaluation.

TABLE 4C

Skin Clarity/Hyperpigmentation Technician Evaluation

|  | Mean ± S.D. | p-value | Mean Change form Baseline | % of Subjects with Improvements from Baseline |
|---|---|---|---|---|
| Baseline | 6.70 ± 0.77 | — | — | — |
| Immediately Post-Application | 6.70 ± 0.77 | 1.000 | 0% | 0% |
| 24 Hours | 6.70 ± 0.77 | 1.000 | 0% | 0% |
| Week 1 | 6.70 ± 0.77 | 1.000 | 0% | 0% |
| Week 4 | 6.67 ± 0.82 | 0.325 | −0.4% | 3% |
| Week 8 | 6.58* ± 0.90 | 0.044 | −1.8% | 12% |

*Statistically significant difference from baseline, p ≤ 0.05

There were improvements of 0.4 and 1.8% after 4 and 8 weeks of product use, respectively. A total of 3% and 12% subjects showed improvement after 4 and 8 weeks of product use, respectfully.

Example 4D: Global Facial Fine Lines/Wrinkles (Plumpness)

This study discloses a clinical evaluation studying improvement in global facial fine lines/wrinkles (plumpness) following application to the face of the gel-cream of Example 1C.

A trained technician evaluated the appearance of global fine lines and wrinkles on the face of each subject according to the scale below:
0=None
1-3=Slight
4-6=Noticeable
7-9=Very noticeable Table 4D below presents a summary of the global fine lines/wrinkles technician evaluation.

TABLE 4D

Global Facial Fine Lines/Wrinkles Tecnician Evaluation

|  | Mean ± S.D. | p-value | Mean Change form Baseline | % of Subjects with Improvements from Baseline |
|---|---|---|---|---|
| Baseline | 6.39 ± 0.90 | — | — | — |
| Immediately Post-Application | 6.39 ± 0.90 | 1.000 | 0% | 0% |
| 24 Hours | 6.39 ± 0.90 | 1.000 | 0% | 0% |
| Week 1 | 6.36 ± 0.90 | 0.325 | −0.5% | 3% |
| Week 4 | 6.36 ± 0.90 | 0.325 | −0.5% | 3% |
| Week 8 | 6.36 ± 0.90 | 0.325 | −0.5% | 3% |

*Statistically significant difference from baseline, p ≤ 0.05

There were improvements of 0.5% after 1, 4, and 8 weeks of product use, respectively. The improvements were not statistically significant. A total of 3% of subjects showed improvement after 1, 4, and 8 weeks of product use.

Example 4E: Skin Elasticity

This study discloses a clinical evaluation studying improvement in skin elasticity following application to the face of the gel-cream of Example 1C.

A trained technician measured skin elasticity on the face of each subject using the Cutometer® R2 parameter. An increase in Cutometer® R2 measurements indicates an improvement (increase) in skin elasticity. A decrease represents a worsening.

Table 4E below presents a summary of the skin elasticity Cutometer® R2 measurements.

TABLE 4E

Skin Elasticity Cutometer® R2 Measurements

|  | Mean ± S.D. | p-value | Mean Change form Baseline | % of Subjects with Improvements from Baseline |
|---|---|---|---|---|
| Baseline | 0.484 ± 0.076 | — | — | — |
| Immediately Post-Application | 0.546* ± 0.081 | <0.001 | 12.8% | 100% |
| 24 Hours | 0.579* ± 0.093 | <0.001 | 19.6% | 100% |
| Week 1 | 0.592* ± 0.092 | <0.001 | 22.3% | 100% |
| Week 4 | 0.602* ± 0.090 | <0.001 | 24.4% | 100% |
| Week 8 | 0.597* ± 0.073 | <0.001 | 23.3% | 100% |

*Statistically significant difference from baseline, p ≤ 0.05

The improvements were highly significant compared with the baseline, with improvements of 12.8%, 19.6%, 22.3%, 24.3%, and 23.3% after first use, 24 hours, 1 week, 4 weeks, and 8 weeks of product use, respectively.

Example 4F: Skin Firmness

This study discloses a clinical evaluation studying improvement in skin firmness following application to the face of the gel-cream of Example 1C.

A trained technician measured skin firmness on the face of each subject using the Cutometer® R0 parameter. A decrease in Cutometer® R0 measurements indicates an improvement (increase) in skin firmness. An increase represents a worsening.

Table 4F below presents a summary of the skin elasticity Cutometer® R2 measurements.

TABLE 4F

Skin Firmness Cutometer ® R0 Measurements

| | Mean ± S.D. | p-value | Mean Change form Baseline | % of Subjects with Improvements from Baseline |
|---|---|---|---|---|
| Baseline | 0.187 ± 0.043 | — | — | — |
| Immediately Post-Application | 0.207 ± 0.036 | 0.090 | 10.7% | 36% |
| 24 Hours | 0.141* ± 0.029 | <0.001 | −24.6% | 76% |
| Week 1 | 0.107* ± 0.042 | <0.001 | −42.8% | 88% |
| Week 4 | 0.075* ± 0.035 | <0.001 | −59.9% | 100% |
| Week 8 | 0.129* ± 0.032 | <0.001 | −31.0% | 85% |

*Statistically significant difference from baseline, $p \leq 0.05$

The improvements were statistically significant compared with the baseline, with improvements of 24.6%, 42.8%, 59.9%, and 31.0% after 24 hours, 1 week, 4 weeks and 8 weeks of product use, respectively.

Example 4G: Skin Hydration

This study discloses a clinical evaluation studying improvement in skin hydration following application to the face of the gel-cream of Example 1C.

A trained technician measured skin hydration on the face of each subject using the Corneometer® measurements. An increase in Corneometer® measurements indicates an improvement (increase) in skin moisture. A decrease represents a worsening.

Table 2G below presents a summary of the skin hydration Corneometer® measurements.

TABLE 2G

Skin Hydration Corneometer ® Measurements

| | Mean ± S.D. | p-value | Mean Change form Baseline | % of Subjects with Improvements from Baseline |
|---|---|---|---|---|
| Baseline | 38.8 ± 5.1 | — | — | — |
| Immediately Post-Application | 57.7* ± 9.3 | <0.001 | 48.7% | 100% |
| 24 Hours | 62.1* ± 9.3 | <0.001 | 60.1% | 100% |
| Week 1 | 64.8* ± 7.3 | <0.001 | 67.0% | 100% |
| Week 4 | 67.1* ± 7.5 | <0.001 | 72.9% | 94% |
| Week 8 | 63.7* ± 9.7 | <0.001 | 64.2% | 97% |

*Statistically significant difference from baseline, $p \leq 0.05$

The improvements were highly significant compared with the baseline, with improvements of 48.7%, 60.1%, 67.0%, 72.9%, and 64.2% after first use, 24 hours, 1 week, 4 weeks, and 8 weeks of product use, respectively.

Example 4H: Skin Irritation Study

This study discloses a clinical evaluation studying unwanted skin irritation following application to the face of the gel-cream of Example 1C.

At each visit, a trained technician evaluated the face of each subject for irritation according to the scale below:
0=No evidence of any irritation
+=Barely perceptible irritation present
1=Mild irritation present
2=Moderate irritation present
3=Marked irritation present
4=Severe irritation present The individual subject evaluation results are disclosed in Table 4H below:

TABLE 4H

Skin Irritation Technical Evaluation

| Subject No. | Baseline | Immediate | 24 Hours | Week 1 | Week 4 | Week 8 |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11* | | DISCONTINUED | | | | |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | 0 | 0 | 0 | 0 | 0 | 0 |
| 16 | 0 | 0 | 0 | 0 | 0 | 0 |
| 17 | 0 | 0 | 0 | 0 | 0 | 0 |
| 18 | 0 | 0 | 0 | 0 | 0 | 0 |
| 19 | 0 | 0 | 0 | 0 | 0 | 0 |
| 20 | 0 | 0 | 0 | 0 | 0 | 0 |
| 21 | 0 | 0 | 0 | 0 | 0 | 0 |
| 22 | 0 | 0 | 0 | 0 | 0 | 0 |
| 23 | 0 | 0 | 0 | 0 | 0 | 0 |
| 24 | 0 | 0 | 0 | 0 | 0 | 0 |
| 25 | 0 | 0 | 0 | 0 | 0 | 0 |
| 26 | 0 | 0 | 0 | 0 | 0 | 0 |
| 27 | 0 | 0 | 0 | 0 | 0 | 0 |
| 28 | 0 | 0 | 0 | 0 | 0 | 0 |
| 29 | 0 | 0 | 0 | 0 | 0 | 0 |
| 30 | 0 | 0 | 0 | 0 | 0 | 0 |
| 31 | 0 | 0 | 0 | 0 | 0 | 0 |
| 32 | 0 | 0 | 0 | 0 | 0 | 0 |
| 33 | 0 | 0 | 0 | 0 | 0 | 0 |
| 34 | 0 | 0 | 0 | 0 | 0 | 0 |
| MEAN | 0.0 | 0.0 | 0.0 | 0.0 | 0.0 | 0.0 |

*Subject 11 discontinued for personal reasons unrelated to the conduct of the study.

There was no irritation observed on any subject during the course of the study.

Example 5: Clinical Evaluations—Image Analysis

At baseline, after first use, after 24 hours, and after 1 week, 4 weeks, and 8 weeks of use of the gel-cream of Example 1C, a trained technician took digital images of the face of each subject. Using ImagePro® software, the images were analyzed to determine changes in the appearance of skin radiance/luminosity, skin texture/smoothness, skin clarity/hyperpigmentation, and global facial fine lines/wrinkles (plumpness).

Example 5A: Skin Radiance/Luminosity Study

In order to determine changes in skin radiance/luminosity, facial luminance was analyzed. Facial luminance is a single number calculated based on the uniformity of the lightening of the image. An increase in the facial luminance score represents an improvement in overall skin luminance. A decrease represents a worsening.

Table 5A below presents a summary of the skin radiance/luminosity image analysis.

TABLE 5A

Skin Radiance/Luminosity Image Analysis

|  | Mean ± S.D. | p-value | Mean Change form Baseline | % of Subjects with Improvements from Baseline |
|---|---|---|---|---|
| Baseline | 119.1 ± 16.6 | — | — | — |
| Immediately Post-Application | 119.5 ± 17.1 | 0.855 | 0.3% | 42% |
| 24 Hours | 119.3 ± 16.6 | 0.780 | 0.2% | 48% |
| Week 1 | 120.6* ± 17.5 | 0.041 | 1.3% | 58% |
| Week 4 | 120.0 ± 16.0 | 0.092 | 0.8% | 61% |
| Week 8 | 121.0* ± 16.7 | 0.018 | 1.6% | 67% |

*Statistically significant difference from baseline, $p \leq 0.05$

There were mean improvements of 0.3%, 0.2%, 1.3%, 0.8%, and 1.6% observed after first use, 24 hours, 1 week, 4 weeks, and 8 weeks, respectively. The improvements after 1 week and 8 weeks were statistically significant.

Example 5B: Skin Texture Study

In order to determine changes in skin texture/smoothness, each digital image was scanned horizontally and vertically to collect the red, green, and blue intensities of the pixels. The proprietary mathematical algorithm in Visia CR® uses the pixel intensities of the scanned areas to calculate the texture score based on the totals of the mean intensities of the red, green, and blue pixels. Texture scores are a single number calculated based on skin features. A decrease in the texture score represents an improvement in overall skin texture. An increase represents a worsening.

Table 5B below presents a summary of the skin texture/smoothness image analysis.

TABLE 5B

Skin Texture/Smoothness Image Analysis

|  | Mean ± S.D. | p-value | Mean Change form Baseline | % of Subjects with Improvements from Baseline |
|---|---|---|---|---|
| Baseline | 260.8 ± 32.2 | — | — | — |
| Immediately Post-Application | 306.2* ± 44.2 | <0.001 | 17.4% | 0% |
| 24 Hours | 264.1 ± 35.4 | 0.618 | 1.3% | 42% |
| Week 1 | 265.1 ± 35.0 | 0.385 | 1.6% | 42% |
| Week 4 | 263.8 ± 40.6 | 0.720 | 1.2% | 52% |
| Week 8 | 266.7 ± 40.6 | 0.720 | 2.3% | 61% |

*Statistically significant difference from baseline, $p \leq 0.05$

Despite the means indicating a negative outcome on skin texture/smoothness, 42%, 42%, 52%, and 61% of patients observed improvements in skin texture/smoothness after 24 hours, 1 week, 4 weeks, and 8 weeks of use, respectively.

Example 5C: Skin Clarity/Hyperpigmentation

In order to determine changes hyperpigmentation, the CIE b* value was analyzed using the UV lighting images. UV lighting enhances the display hyperpigmentation by visualizing the melanin pigmentation. A decrease in the b* value corresponds to a whitening/improvement (decrease in color) effect and an increase in the b* represents a darkening/worsening.

Table 5C below presents a summary of the skin clarity/hyperpigmentation image analysis.

TABLE 5C

Skin Clarity/Hyperpigmentation Image Analysis

|  | Mean ± S.D. | p-value | Mean Change form Baseline | % of Subjects with Improvements from Baseline |
|---|---|---|---|---|
| Baseline | 21.8 ± 5.4 | — | — | — |
| Immediately Post-Application | 22.4* ± 5.5 | <0.001 | 2.8% | 24% |
| 24 Hours | 21.3* ± 5.4 | 0.024 | −2.3% | 73% |
| Week 1 | 21.6 ± 5.6 | 0.338 | −0.9% | 56% |
| Week 4 | 21.0* ± 5.4 | <0.001 | −3.7% | 79% |
| Week 8 | 21.4* ± 5.5 | 0.039 | −1.6% | 79% |

*Statistically significant difference from baseline, $p \leq 0.05$

There were mean improvements of 2.3%, 0.9%, 3.7%, and 1.8% after 24 hours, 1 week, 4 week, and 8 weeks, respectfully. The changes after 24 hours, 4 weeks, and 8 weeks were statistically significant.

Example 5D: Global Facial Fine Lines/Wrinkles (Plumpness)

In order to determine changes in global facial fine lines/wrinkles, each digital image was scanned horizontally and vertically to collect the red, green, and blue intensities of the pixels. The proprietary mathematical algorithm in Visia CR® uses the pixel intensities of the scanned areas to calculate the texture score based on the totals of the mean intensities of the red, green, and blue pixels. Texture scores are a single number calculated based on skin features. A decrease in the texture score represents an improvement (or decrease) in the appearance of global facial fine lines/wrinkles.

Table 5D below presents a summary of the global facial fine lines/wrinkles image analysis.

TABLE 5D

Global Facial Fine Lines/Wrinkles Image Analysis

|  | Mean ± S.D. | p-value | Mean Change form Baseline | % of Subjects with Improvements from Baseline |
|---|---|---|---|---|
| Baseline | 867.8 ± 477.4 | — | — | — |
| Immediately Post-Application | 705.1* ± 103.1 | <0.001 | −18.7% | 97% |
| 24 Hours | 665.4* ± 86.7 | <0.001 | −23.3% | 97% |
| Week 1 | 626.9* ± 72.4 | <0.001 | −27.8% | 100% |
| Week 4 | 612.0* ± 45.5 | <0.001 | −29.5% | 100% |
| Week 8 | 545.4* ± 73.9 | <0.001 | −37.2% | 100% |

*Statistically significant difference from baseline, $p \leq 0.05$

The improvements were highly significant compared with the baseline, with improvements of 18.7%, 23.3%, 27.8%, 29.5%, and 37.2% after first use, 24 hours, 1 week, 4 weeks, and 8 weeks of product use, respectively.

Conclusions

These clinical efficacy studies indicate the gel-cream of Example 1C delivers instant luminosity/radiance and plumper looking skin along with 24-hour hydration.

And within 4 weeks skin appears brighter and tighter, skin is firmer, and there is a visible reduction in fine lines and wrinkles.

The gel-cream accomplishes and enhances the effects of Vitamin C without any unwanted irritation.

Example 6—Antioxidant Capacity Determination of Serum and Gel-Cream

SUMMARY

The purpose of this study was to evaluate the overall antioxidant capacity of the serum formula of Example 1B and gel-cream formula of Example 1C for their ability to reduce the free radical 2,2-Diphenyl-1-picrylhydrazyl (DPPH). Kedare and Singh (2011). Genesis and development of DPPH method of antioxidant assay. (See J. Food Sci Technol. 2011 August; 48(4): 412-422.) Ascorbic Acid (Vitamin C) was used as positive antioxidant control in the assay. The testing involved the suppression of optical density (OD) at 530 nm to a degree, which is proportional to an effective antioxidant activity.

Test and control agents were stored at recommended storage temperature until use. An initial 0.1, 1 or 10% v/v dilution was prepared for each test formula in ultra-pure grade water or CAPTEX® 355. Serial 2-fold dilutions were prepared for each material and mixed with DPPH in ethanol solution. All samples were compared to diluent-only treated samples used as negative antioxidant activity. Optical density changes at 530 nm were evaluated 10 minutes after addition of DPPH to each sample. Average absorbance was calculated and plotted for each sample concentration. Effective antioxidant inhibition activity based on the change of absorbance of blank (diluent-only) sample (no material added). Results produced by OD changes for each test material showed different antioxidant capacities.

Ascorbic Acid (20% Vitamin C) solution used as positive control provided strong antioxidant activity with maximum effective activity of 0.0125% v/v (dilution factor=8,000) in DPPH solution. The gel-cream formulation of Example 1C provided antioxidant activity with effective concentration in the 100-dilution range. The serum formulation of Example 1B provided a antioxidant activity with effective concentration in the 101-50 dilution range.

Experimental Design

The DPPH antioxidant assay method was performed to measure antioxidant capacity of test materials. The free radical, 2,2-Diphenyl-1-picrylhydrazyl (DPPH) was obtained from Cayman Chemical Co. (Cat. No. 14805) and a 0.2 mM (0.0788 mg/mL) solution was prepared with 200-proof ethanol (Acros Organics, Cat No. 61509-0020). The assay consisted in the evaluation of the overall antioxidant capacity of test materials (Kedare and Singh, 2011) for the ability to reduce DPPH (purple color), a stable free radical to DPPHH (Diphenylpicrylhydrazine; light yellow color). The testing involved the suppression of optical density (OD) at 517-530 nm to a degree which is proportional to an effective antioxidant activity. The antioxidant capacity of each material was compared to ascorbic acid (vitamin C) used as standard control. An initial 0.1, 1 or 10% v/v dilution was prepared for each test formula in ultra-pure grade water or CAPTEX® 355. Two-fold serial dilutions were made from the stock solution samples. Negative control wells only diluent was added.

The vehicle/diluent used was ultra-pure grade water (Cayman Chemical, Co.; Cat No. 400000) or CAPTEX® 355 (ABITEC Corp.; Lot No. 170310UT14). Diluents were stored at room temperature and handled by the research scientist. To prepare the serum stock formulation (0.1, 1, 10% v/v), 1:10, 1:100 or 1:1000 dilutions were prepared using a positive displacement pipette. To prepare the 20% Ascorbic Acid and 0.05% stock formulation, a 1-dram glass screw-top vial container was pre-weighed and material added to the container followed by addition of neat vehicle to make a 200 mg/mL or 0.05 mg/mL solution, respectively. Two-fold serial dilutions were made from the stock solution samples. Each mixture was stirred for a few minutes until uniform. Vials were sealed and formulations were immediately used for antioxidant assays.

Laboratory room was set with temperature monitored, controlled and ranged 21-24° C.

Results

Summary Results of DPPH antioxidant assay of the daily serum of Example 1B and gel-cream of Example 1C are presented in Table 6A.

TABLE 6A

| Test Material | Maximum effective Antioxidant Activity* | |
| --- | --- | --- |
|  | Concentration (% v/v) | Dilution Factor |
| 20% Ascorbic Acid | 0.0125 | 8,000 |
| Gel-Cream | 0.625 | 160 |
| Daily Serum | 2.5 | 40 |

*DPPH antioxidant activity near 100%

DPPH Antioxidant Assay Results of the daily serum of Example 1B and gel-cream of Example 1C from 10% v/v stock* are presented in Table 6B.

TABLE 6B

| Concentration (% v/v) | Daily Serum | Gel-Cream |
| --- | --- | --- |
| 0.08 | 26 ± 15 | 44 ± 5 |
| 0.16 | 44 ± 14 | 68 ± 4 |
| 0.31 | 61 ± 13 | 81 ± 2 |
| 0.63 | 73 ± 10 | 76 ± 6 |
| 1.25 | 82 ± 7 | # |
| 2.50 | 96 ± 1 | # |
| 5.00 | 100 ± 0 | # |

*Results represent Avg ± SEM antioxidant activity percent (%) cumulative data from three independent experiments each sample run in fourplicates.
Formulation precipitation observed at ≥1.25 % v/v concentration.

DPPH Antioxidant Assay Results of 20% ascorbic acid (i.e. Vitamin C) from 0.1% v/v stock* are presented in Table 6C.

TABLE 6C

| Concentration (% v/v) | 20% Ascorbic Acid |
| --- | --- |
| 0.001 | 38 ± 8 |
| 0.002 | 31 ± 11 |
| 0.003 | 50 ± 13 |
| 0.006 | 91 ± 4 |
| 0.013 | 100 ± 0 |
| 0.025 | 100 ± 0 |
| 0.050 | 100 ± 0 |

*Results represent Avg ± SEM antioxidant activity percent (%) cumulative data from three independent experiments each sample run in fourplicates.

DPPH Antioxidant activity of test formulas. Positive antioxidant activity is correlated to decolorization (reduction) of DPPH (purple) to DPPHH (light yellow).

Average absorbance was calculated and plotted for each sample concentration. Effective antioxidant inhibition activity based on the change of absorbance of blank (diluent-only) sample (no material added). Results produced by OD changes for each test material showed different antioxidant capacities. Ascorbic Acid (20% Vitamin C) solution used as positive control provided strong antioxidant activity with maximum effective activity of 0.0125% v/v (dilution factor=8,000) in DPPH solution. The gel-cream of Example 1C provided antioxidant activity with effective concentration in the 100-dilution range. The serum of Example 1B provided antioxidant activity with effective concentration in the 101-50 dilution range.

The results of the study are depicted in FIG. 1.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A cosmetic composition comprising about 0.9 wt. % to about 3.00 wt. % of a Vitamin C compound, about 0.001 wt. % to about 1.0 wt. % of a peptide, about 0.01 wt. % to about 3.00 wt. % of an antioxidant, and up to about 3 wt. % of a hydrating agent;
   wherein the Vitamin C compound comprises 3-O-ethyl ascorbic acid, *Terminalia ferdinandiana* fruit extract, tetrahexyldecyl ascorbate, or a combination thereof,
   wherein the antioxidant comprises *Cistus monspeliensis* flower, leaf, and stem extract, troxerutin, *Polygonum aviculare* extract, or a combination thereof,
   wherein the peptide comprises nonapeptide-1 and
   wherein the hydrating agent comprises PPG-24-glycereth-24, Sodium PCA, a plant-based glyceride, a fruit complex, or a combination thereof.

2. The cosmetic composition of claim 1, wherein the Vitamin C compound comprises the combination of 3-O-ethyl ascorbic acid and *Terminalia ferdinandiana* fruit extract.

3. The cosmetic composition of claim 1, wherein the antioxidant comprises a combination of *Cistus monspeliensis* flower, leaf, and stem extract, troxerutin, and *Polygonum aviculare* extract.

4. The cosmetic composition of claim 1, wherein the hydrating agent comprises PPG-24-glycereth-24.

5. The cosmetic composition of claim 1, wherein the hydrating agent comprises a plant-based glyceride, a fruit complex, or a combination thereof.

6. The cosmetic composition of claim 1, wherein said composition is an oil-in-water emulsion or a gel-cream.

7. The cosmetic composition of claim 1, wherein the Vitamin C compound is present in an amount of from about 0.9% to about 1.0% by weight of the composition, the peptide is present in an amount of from about 0.001% to about 0.005% by weight of the composition, the antioxidant is present in an amount of from about 0.01% to about 1% by weight of the composition, and the hydrating agent is present in an amount up to about 1% by weight of the composition.

8. The cosmetic composition of claim 7, wherein the Vitamin C compound is present at up to about 1.00% by weight of the composition, the peptide is present at up to about 0.005% by weight of the composition, the antioxidant is present at up to about 0.25% by weight of the composition, and the hydrating agent is present at up to about 1.00% by weight of the composition.

9. The cosmetic composition of claim 1, wherein the composition does not cause skin irritation.

10. A method of improving the skin comprising topically applying the cosmetic composition of claim 1.

11. The method of claim 10, wherein improving the skin comprises visibly brightening the skin, visibly evening skin tone, visibly tightening the skin, or visibly plumping the skin.

12. The method of claim 10, wherein improving the skin comprises improving the appearance of fine lines and wrinkles.

13. The method of claim 10, wherein the composition is applied to a cleansed face and/or neck.

14. The method of claim 10, wherein the composition is applied in the evening.

15. The cosmetic composition of claim 1, wherein the vitamin C compound is a combination of 3-O-ethyl ascorbic acid, *Terminalia ferdinandiana* fruit extract, the peptide is 1-nonapeptide, the antioxidant is a combination of *Cistus monspeliensis* flower, leaf, and stem extract, troxerutin, *Polygonum aviculare* extract, and the hydrating agent is PPG-24-glycereth-24.

16. The cosmetic composition of claim 1, wherein the vitamin C compound is 3-O-ethyl ascorbic acid, the peptide is 1-nonapeptide, the antioxidant is a combination of *Cistus monspeliensis* flower, leaf, and stem extract, troxerutin, and *Polygonum aviculare* extract, and the hydrating agent is a combination of Shea Butter, *Citrullus Vulgaris* (Watermelon) Fruit Extract, *Pyrus Malus* (Apple) Fruit Extract, and *Lens Esculenta* (Lentil) Fruit Extract.

17. The cosmetic composition of claim 1, wherein the vitamin C compound is tetrahexyldecyl ascorbate, the peptide further comprises palmitoyl hexapeptide-12, the antioxidant is *Cistus monspeliensis* flower, leaf, and stem extract, and the hydrating agent is Sodium PCA.

18. The cosmetic composition of claim 1, wherein the vitamin C compound is 3-O-ethyl ascorbic acid, the peptide is nonapeptide-1, the antioxidant is a combination of *Cistus monspeliensis* flower, leaf, and stem extract, troxerutin, and *Polygonum aviculare* extract, and the hydrating agent is a combination of *Citrullus Vulgaris* (Watermelon) Fruit Extract, *Pyrus Malus* (Apple) Fruit Extract, *Lens Esculenta* (Lentil) Fruit Extract, and Sodium PCA.

19. The cosmetic composition of claim 1, wherein the vitamin C compound is 3-O-ethyl ascorbic acid, the peptide is 1-nonapeptide, the antioxidant is a combination of *Cistus monspeliensis* flower, leaf, and stem extract, troxerutin, *Polygonum aviculare* extract, and the hydrating agent is a combination of Shea Butter, *Citrullus Vulgaris* (Watermelon) Fruit Extract, *Pyrus Malus* (Apple) Fruit Extract, *Lens Esculenta* (Lentil) Fruit Extract, and Sodium PCA.

* * * * *